(12) United States Patent
Linstroth et al.

(10) Patent No.: US 9,366,004 B2
(45) Date of Patent: Jun. 14, 2016

(54) EXTENDED REACH CROWD CONTROL FOR A SHOVEL

(71) Applicant: Harnischfeger Technologies, Inc., Wilmington, DE (US)

(72) Inventors: Michael J. Linstroth, Port Washington, WI (US); Joseph J. Colwell, Hubertus, WI (US); Mooyoung Lee, Milwaukee, WI (US); Matthew I. Loew, Hartland, WI (US); Jason Knuth, Brookfield, WI (US); Peter Gizewski, Jr., Milwaukee, WI (US); Justin Zunker, Jackson, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 14/632,532

(22) Filed: Feb. 26, 2015

(65) Prior Publication Data

US 2015/0176240 A1    Jun. 25, 2015

Related U.S. Application Data

(63) Continuation of application No. 13/842,634, filed on Mar. 15, 2013, now Pat. No. 8,972,120.

(60) Provisional application No. 61/686,313, filed on Apr. 3, 2012.

(51) Int. Cl.
*G06F 7/70* (2006.01)
*E02F 3/00* (2006.01)
(Continued)

(52) U.S. Cl.
CPC .............. *E02F 3/382* (2013.01); *E02F 3/304* (2013.01); *E02F 3/38* (2013.01); *E02F 3/46* (2013.01); *E02F 9/2033* (2013.01); *E02F 9/265* (2013.01); *Y10T 29/49716* (2015.01)

(58) Field of Classification Search
USPC ................................ 701/50; 414/694; 404/64
See application file for complete search history.

(56) References Cited

U.S. PATENT DOCUMENTS 3,518,444 A      6/1970  Barber
3,688,930 A *    9/1972  Shumaker ............... E02F 3/306
                                                  414/718

(Continued)

OTHER PUBLICATIONS

Harnischfeger P&H, Model 2300XPB Operators Manual (1994) Bulletin No. 2300XPB-1-OM, 63 pages.

(Continued)

*Primary Examiner* — Thomas G Black
*Assistant Examiner* — Typler Paige
(74) *Attorney, Agent, or Firm* — Michael Best & Friedrich LLP

(57) ABSTRACT

An industrial machine and a method of controlling an industrial machine, the industrial machine including a dipper supported by a dipper handle. The method may include determining an operating phase of the industrial machine, in a first operating phase of the industrial machine, limiting, with at least one controller, a reach of the dipper handle, and in a second operating phase of the industrial machine, enabling, with the at least one controller, an extended reach of the dipper handle greater than the reach in the first operating phase. The industrial machine may include at least one controller configured to determine an operating phase of the industrial machine, in a first operating phase of the industrial machine, limit a reach of the dipper handle, and, in a second operating phase of the industrial machine, enable an extended reach of the dipper handle greater than the reach in the first operating phase.

21 Claims, 39 Drawing Sheets

(51) Int. Cl.
*F16B 7/10* (2006.01)
*E02F 3/38* (2006.01)
*E02F 9/26* (2006.01)
*E02F 3/30* (2006.01)
*E02F 3/46* (2006.01)
*E02F 9/20* (2006.01)

(56) References Cited

U.S. PATENT DOCUMENTS

| | | | | |
|---|---|---|---|---|
| 4,221,531 | A | * | 9/1980 | Baron .................. E02F 3/302 414/694 |
| 4,389,152 | A | * | 6/1983 | Palm ..................... E02F 3/30 414/694 |
| 5,063,739 | A | | 11/1991 | Bianchetta et al. |
| 6,098,322 | A | | 8/2000 | Tozawa et al. |
| 6,219,946 | B1 | * | 4/2001 | Soczka ................. E02F 3/304 188/312 |
| 6,363,632 | B1 | | 4/2002 | Stentz et al. |
| 7,578,079 | B2 | | 8/2009 | Furem |
| 8,788,155 | B2 | * | 7/2014 | Claxton ............... E02F 3/304 37/379 |
| 8,959,805 | B2 | * | 2/2015 | Bienfang ............. E02F 3/4075 37/445 |
| 2003/0061742 | A1 | | 4/2003 | Koch |
| 2005/0163603 | A1 | * | 7/2005 | Kerrigan ............. E02F 3/431 414/700 |
| 2006/0090378 | A1 | | 5/2006 | Furem |
| 2008/0282583 | A1 | | 11/2008 | Koellner et al. |
| 2011/0110708 | A1 | * | 5/2011 | Miotke ................. E02F 3/58 403/64 |
| 2011/0209471 | A1 | | 9/2011 | Vanderlaan et al. |
| 2012/0051877 | A1 | * | 3/2012 | Gilmore .............. E02F 3/306 414/690 |
| 2012/0308354 | A1 | * | 12/2012 | Tafazoli Bilandi ..... B66C 13/46 414/685 |
| 2013/0051963 | A1 | * | 2/2013 | Taylor .................... E02F 3/437 414/685 |
| 2013/0261904 | A1 | | 10/2013 | Linstroth et al. |

OTHER PUBLICATIONS

Harnischfeger P&H, Model 2300XP Operators Manual, Bulletin 2300XP-1-OM (37 pages) publicly available on or before Apr. 2, 2011.
Harnischfeger P&H, Model 2800XP Operators Manual (1984) Bulletin 2800XP-1-OM, 43 pages.
Harnischfeger P&H, Model 4100A Operators Manual (1994) Bulletin No. 4100A-1-OM, 44 pages.
Harnischfeger P&H, Model 1900AL Operators Manual (1985) Bulletin 1900AL-3-OM, 50 pages.
Harnischfeger P&H, Model 2300XPA Operators Manual, Bulletin 2300XPA-1-OM (44 pages) publicly available on or before Apr. 2, 2011.
P&H Peak Services, 2800XPA Shovel Operators Manual (1990) O2800XPA-02-EN, 46 pages.
P&H Peak Services, AC 4100C Boss Electric Mining Shovel S/N ES41211 Operators Manual (2007) O0041211-04-EN, 394 pages.
P&H Peak Services, 4100C Boss Shovel S/N ES41182 Operators Manual (2008) O0041182-02-EN, 418 pages.
P&H Mining Equipment, Model 4100TS Operators Manual (1999) 4100TS-2-OM, 90 pages.
P&H Mining Equipment, Model 4100TS Operators Manual (1998) 4100TS-1-OM, 72 pages.
P&H Mining Equipment, Model 2100BL Operators Manual (1979) Bulletin 2100 BL-2-OM, 40 pages.

* cited by examiner

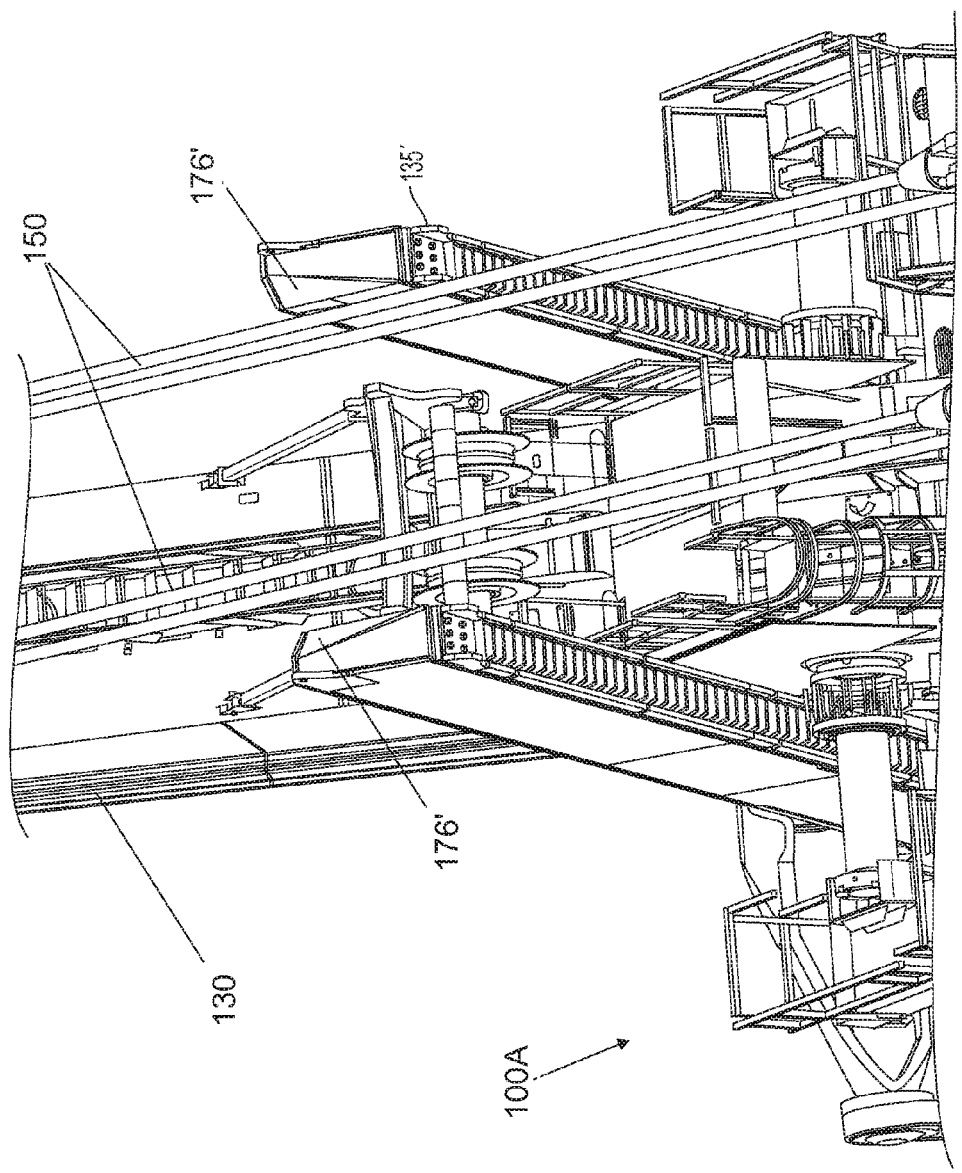

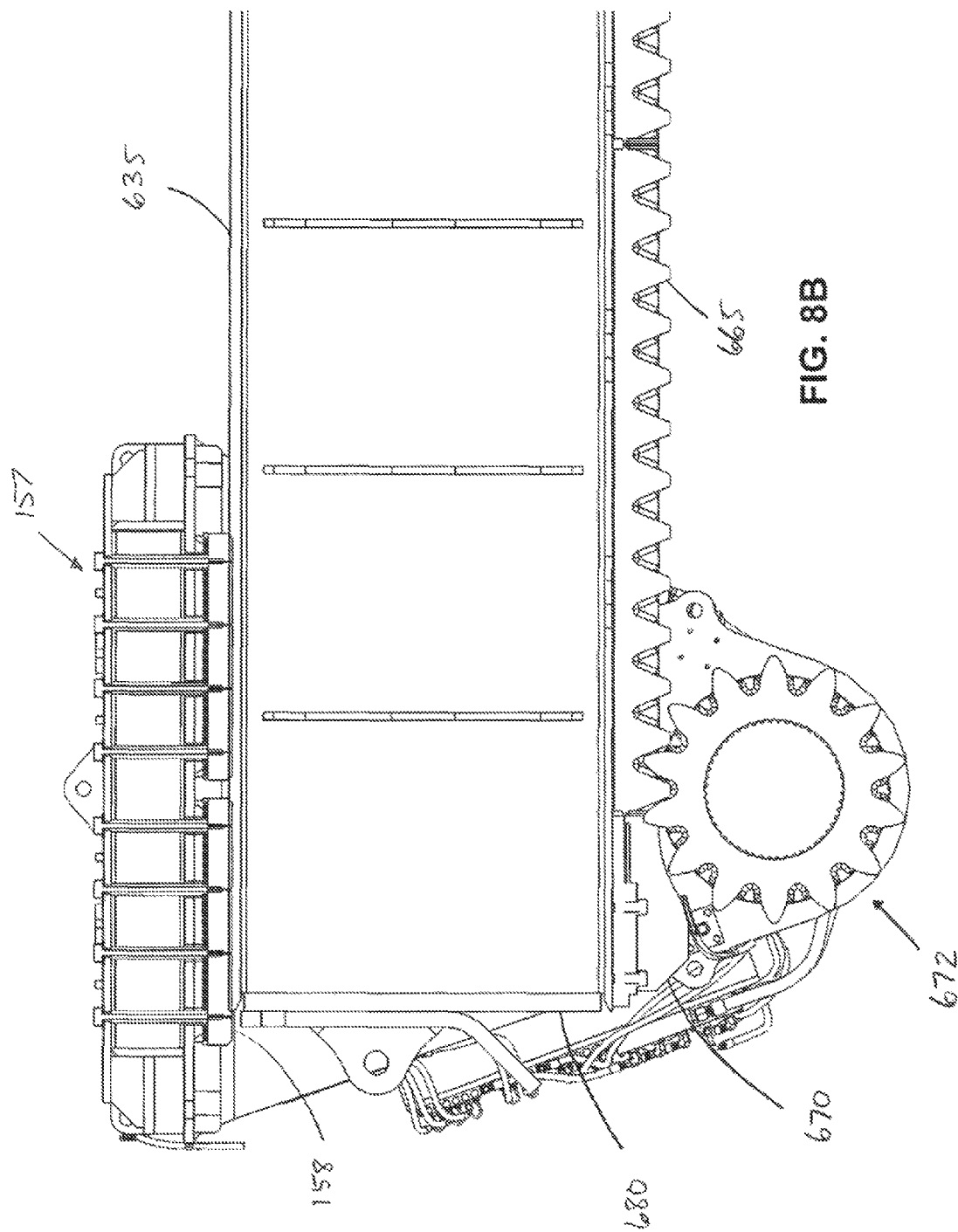

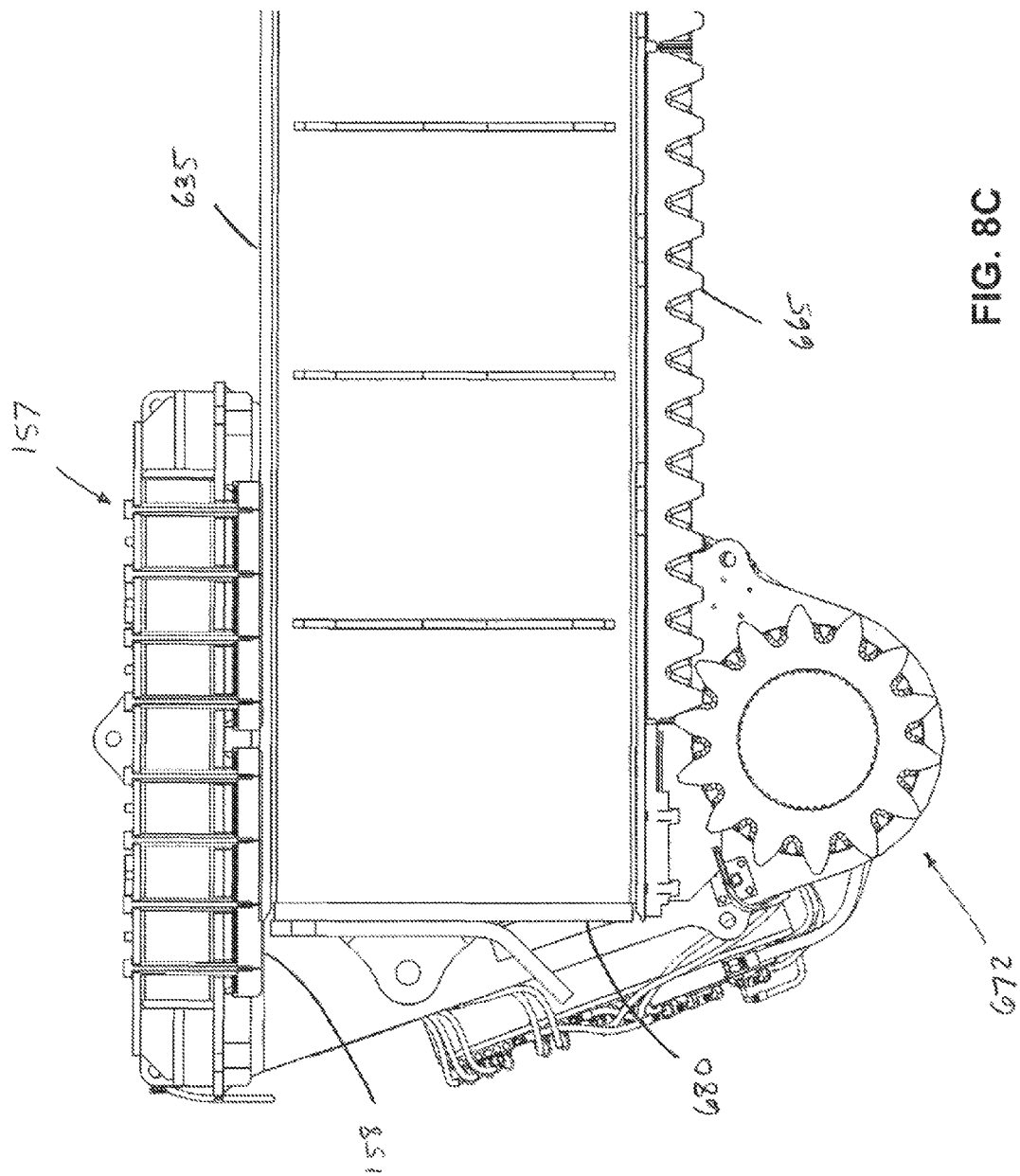

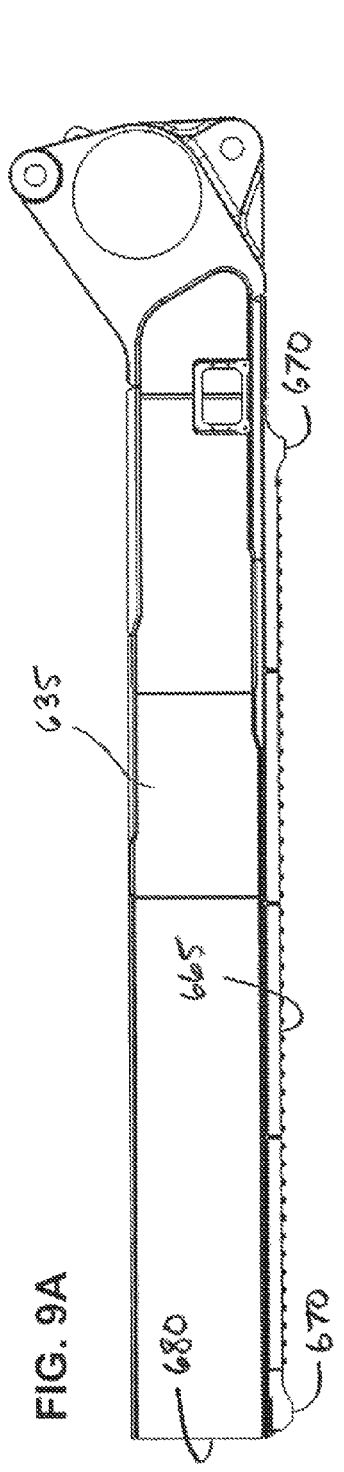
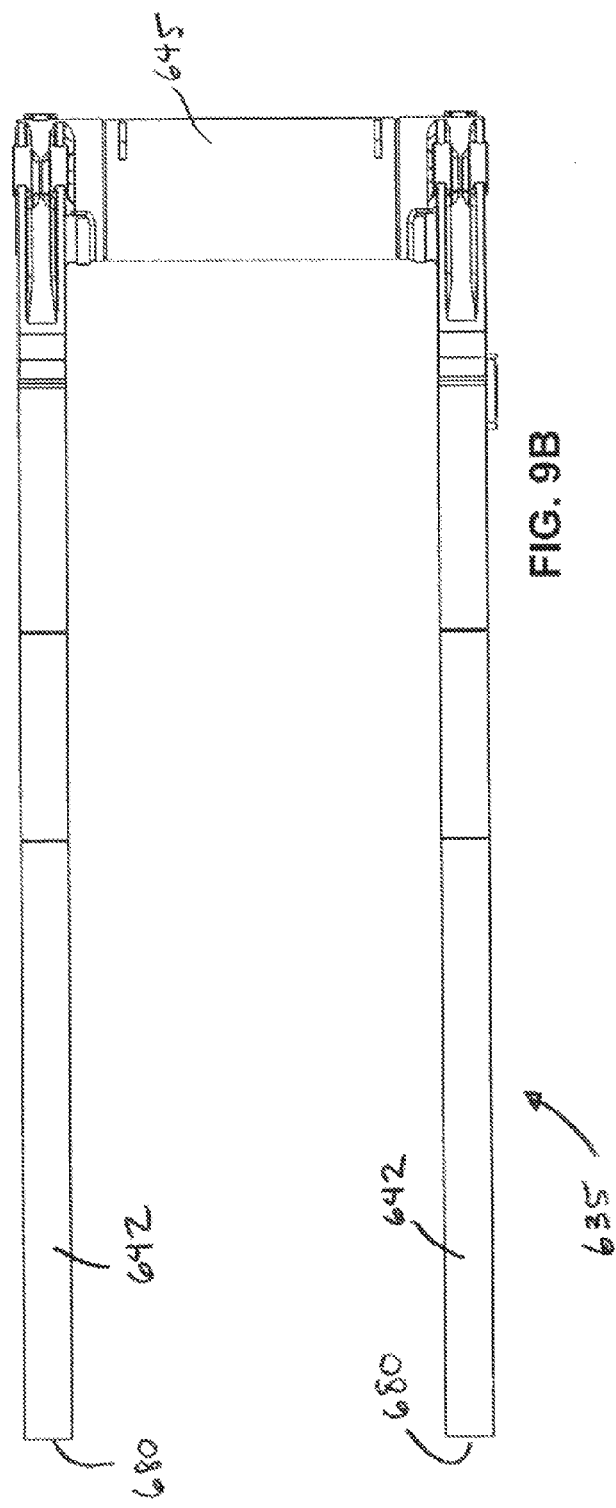

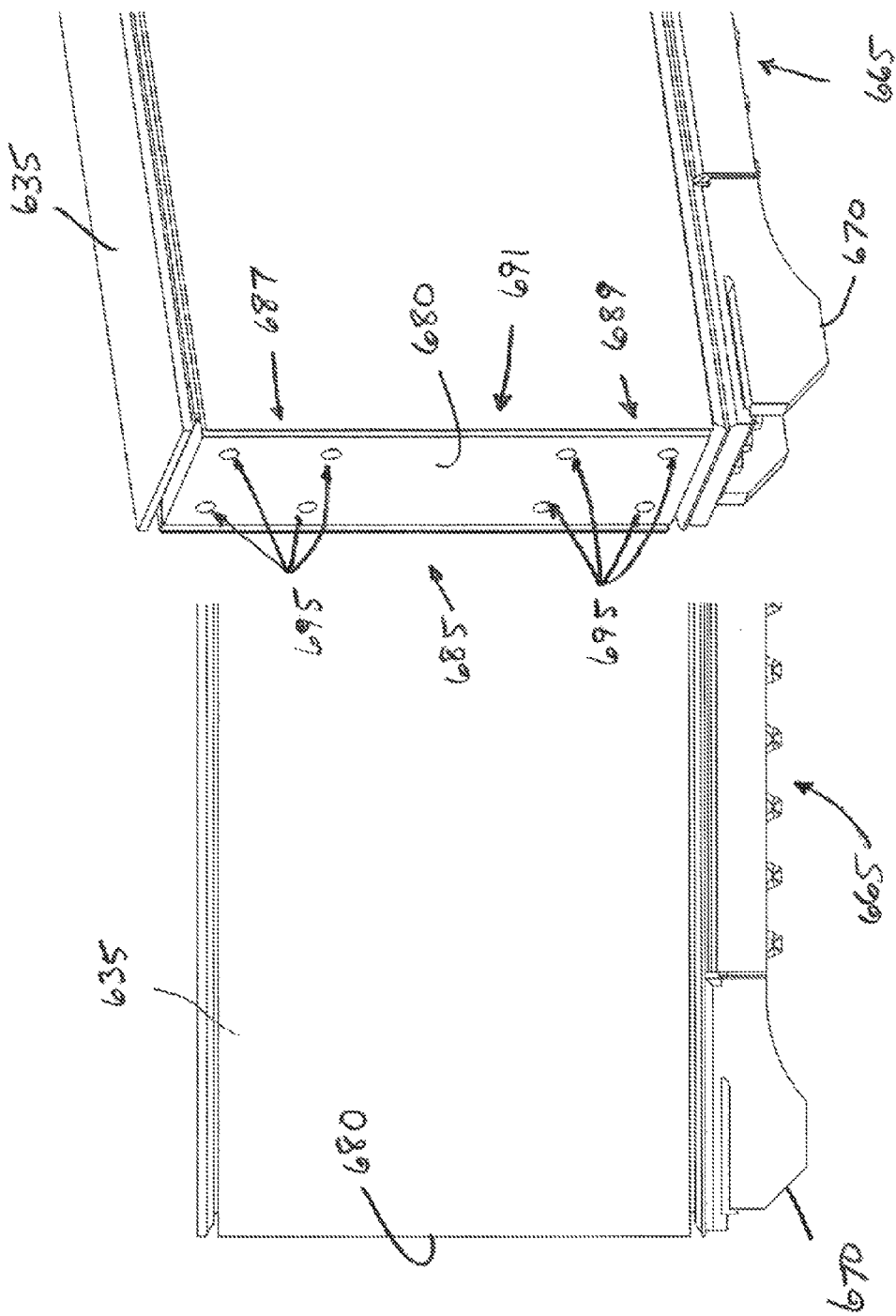

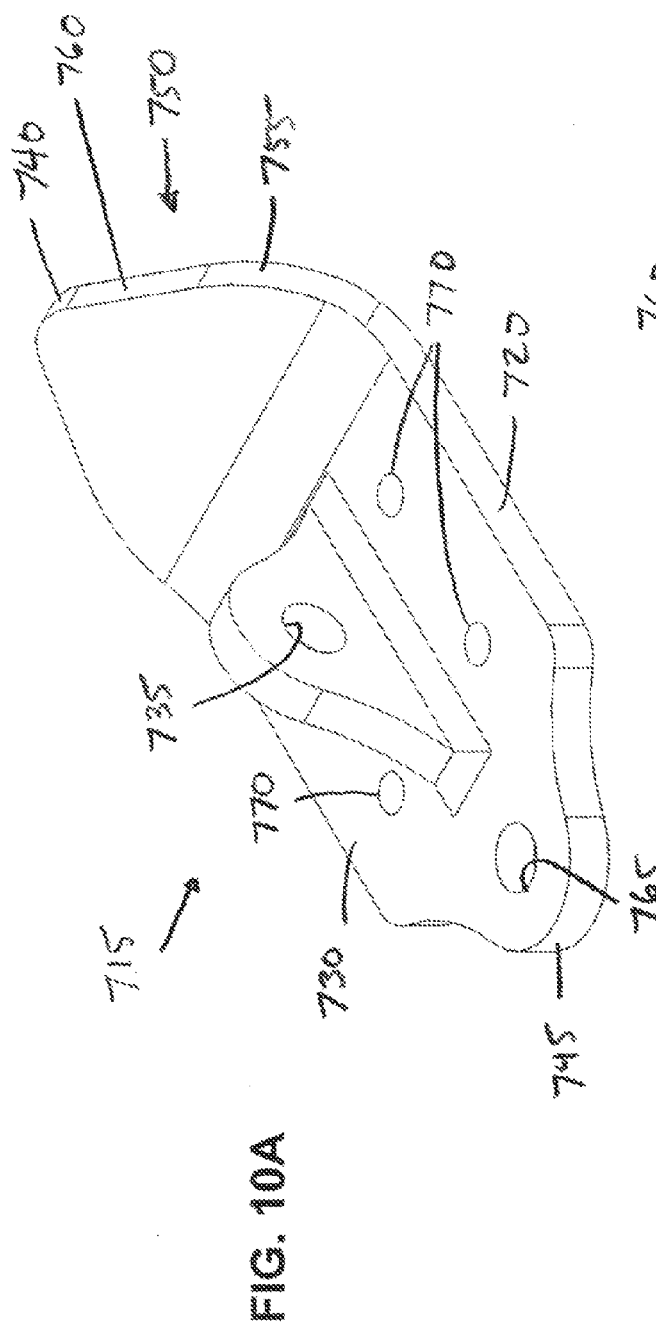
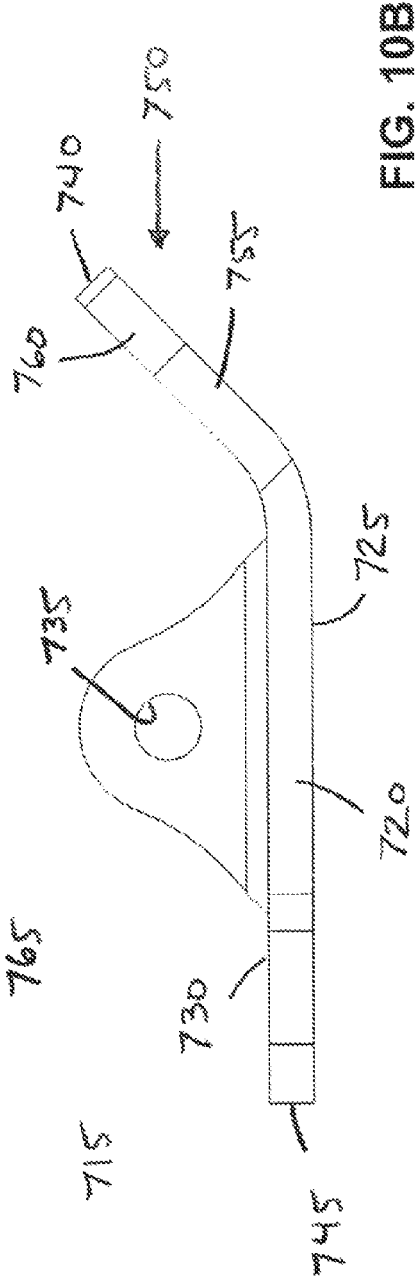
FIG. 10A
FIG. 10B

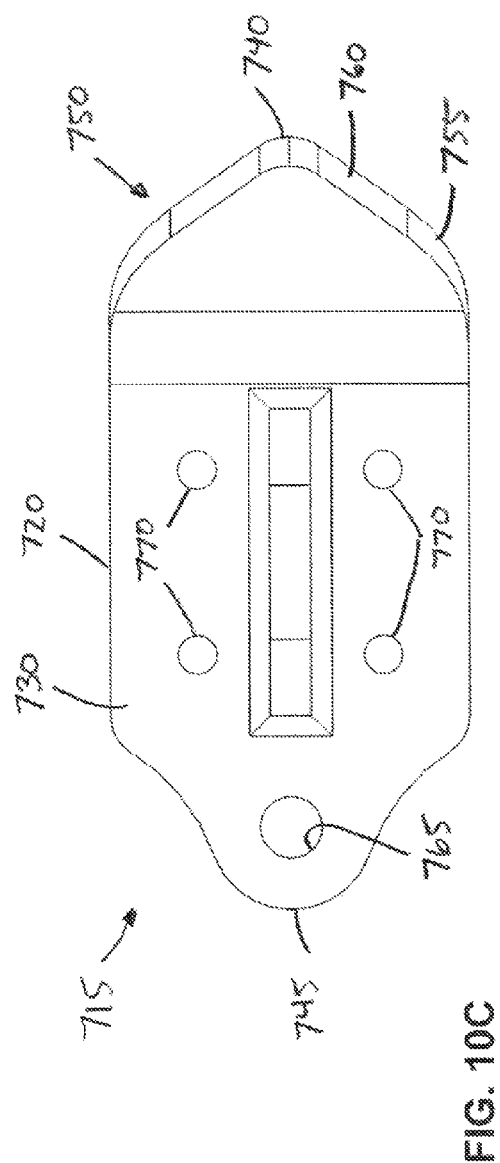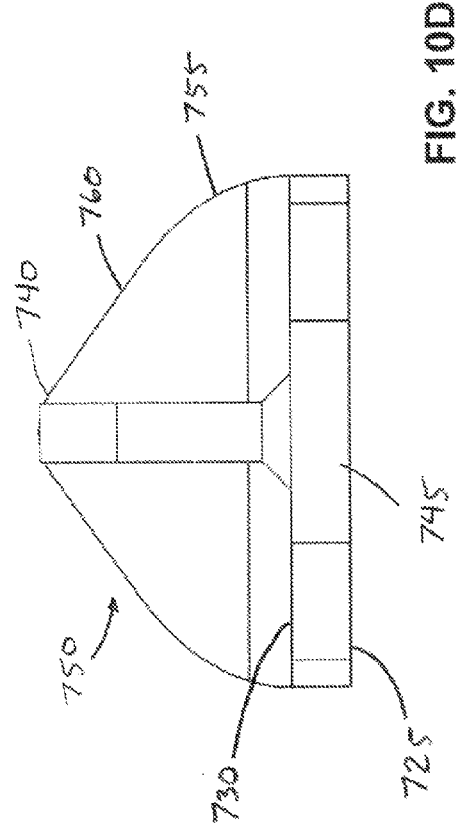

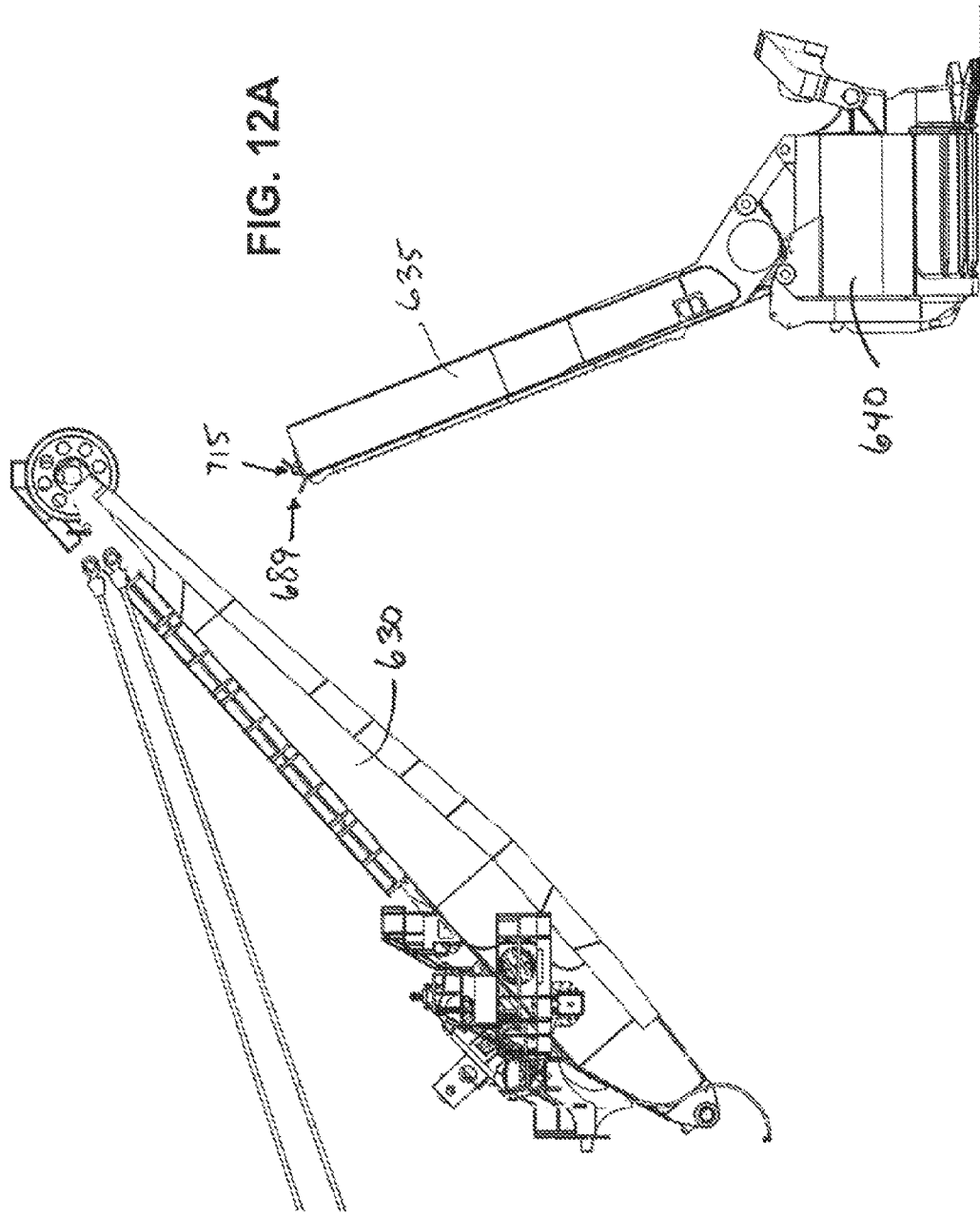

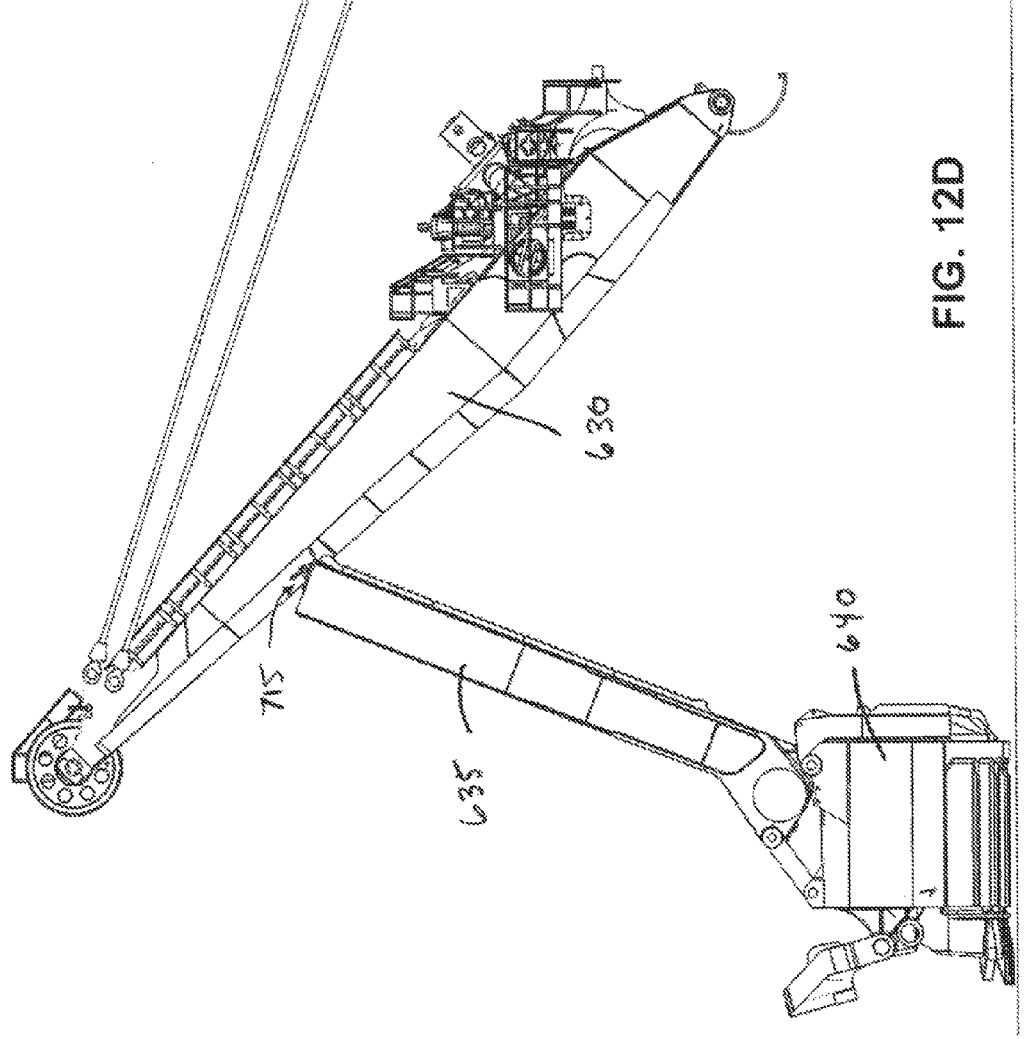

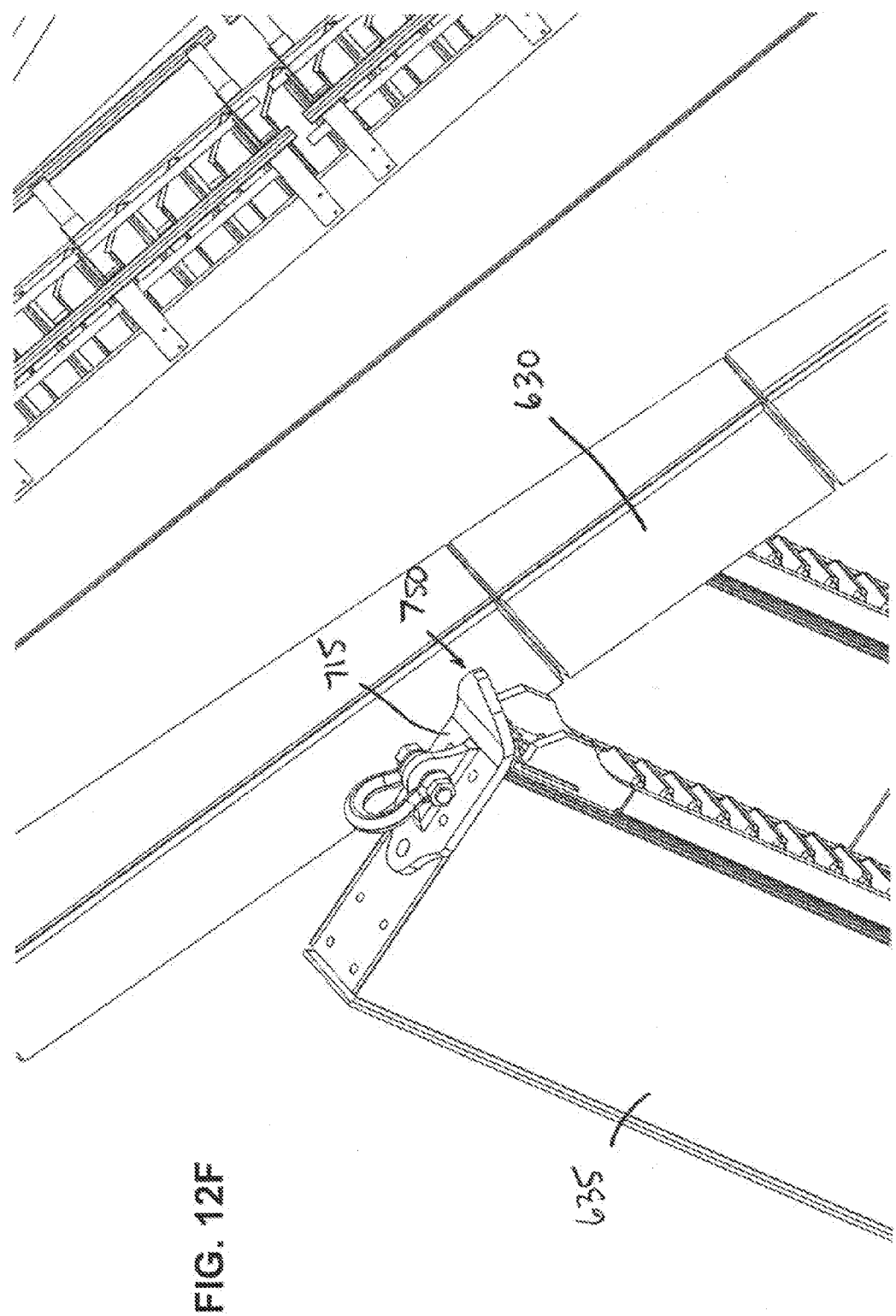

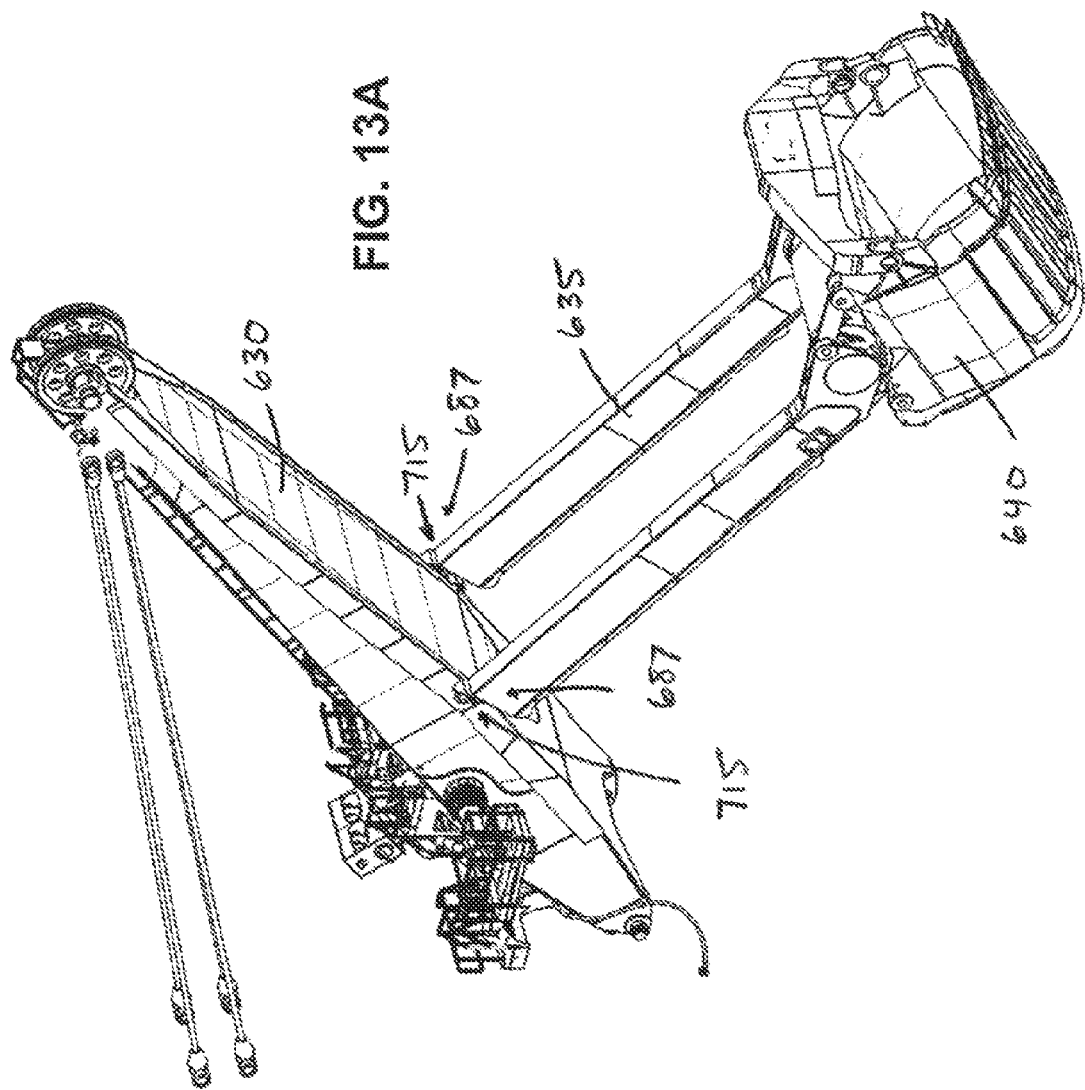

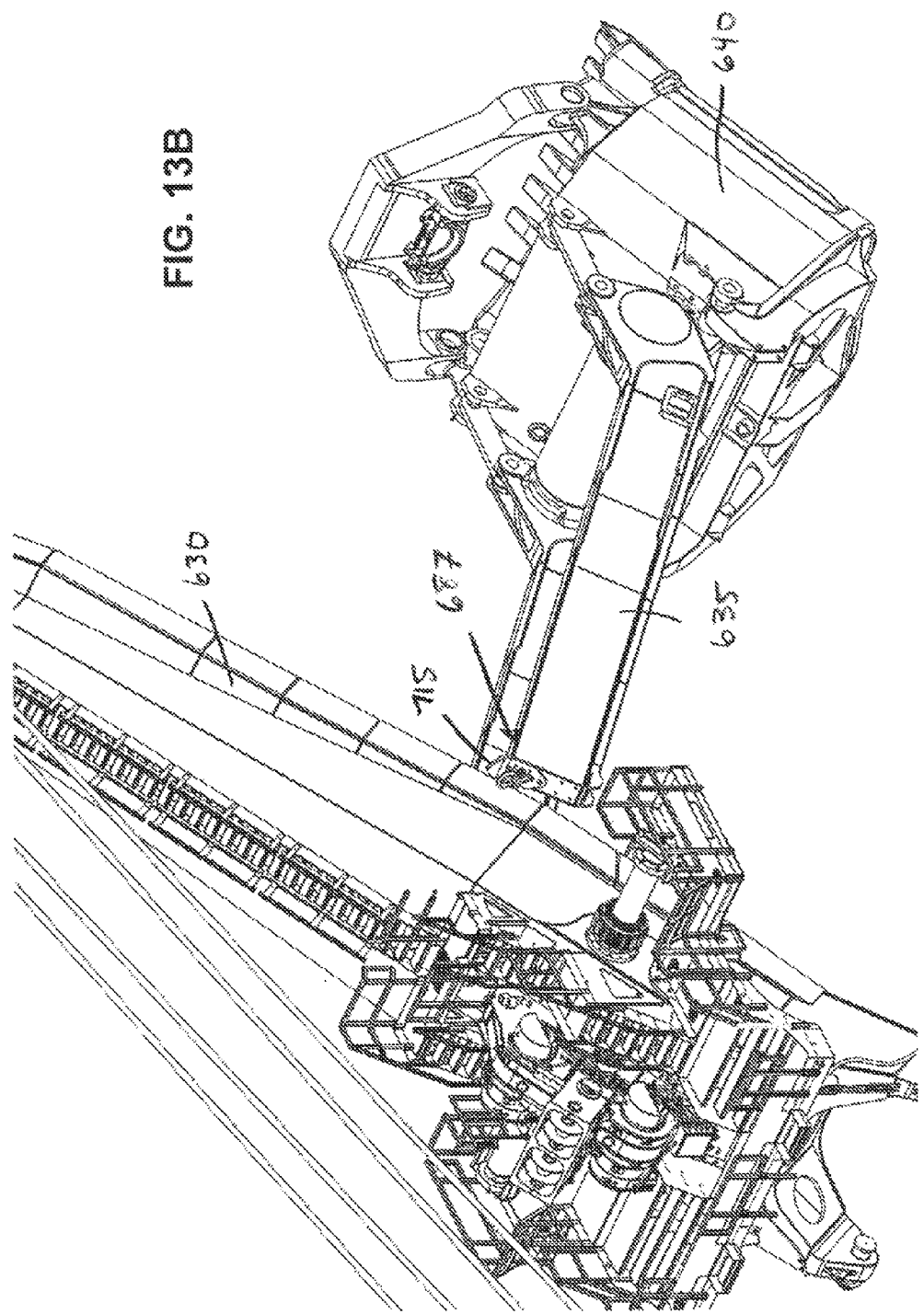

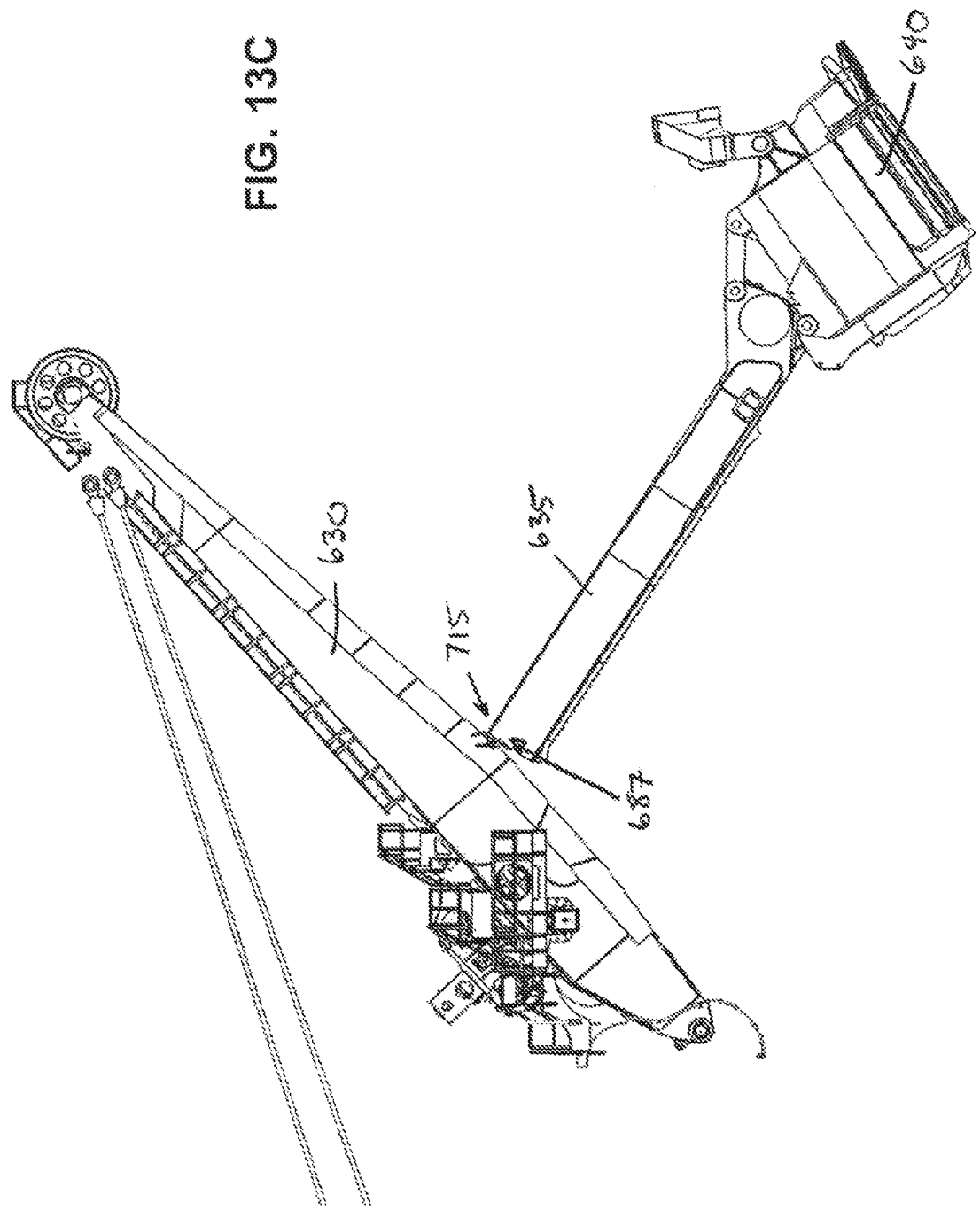

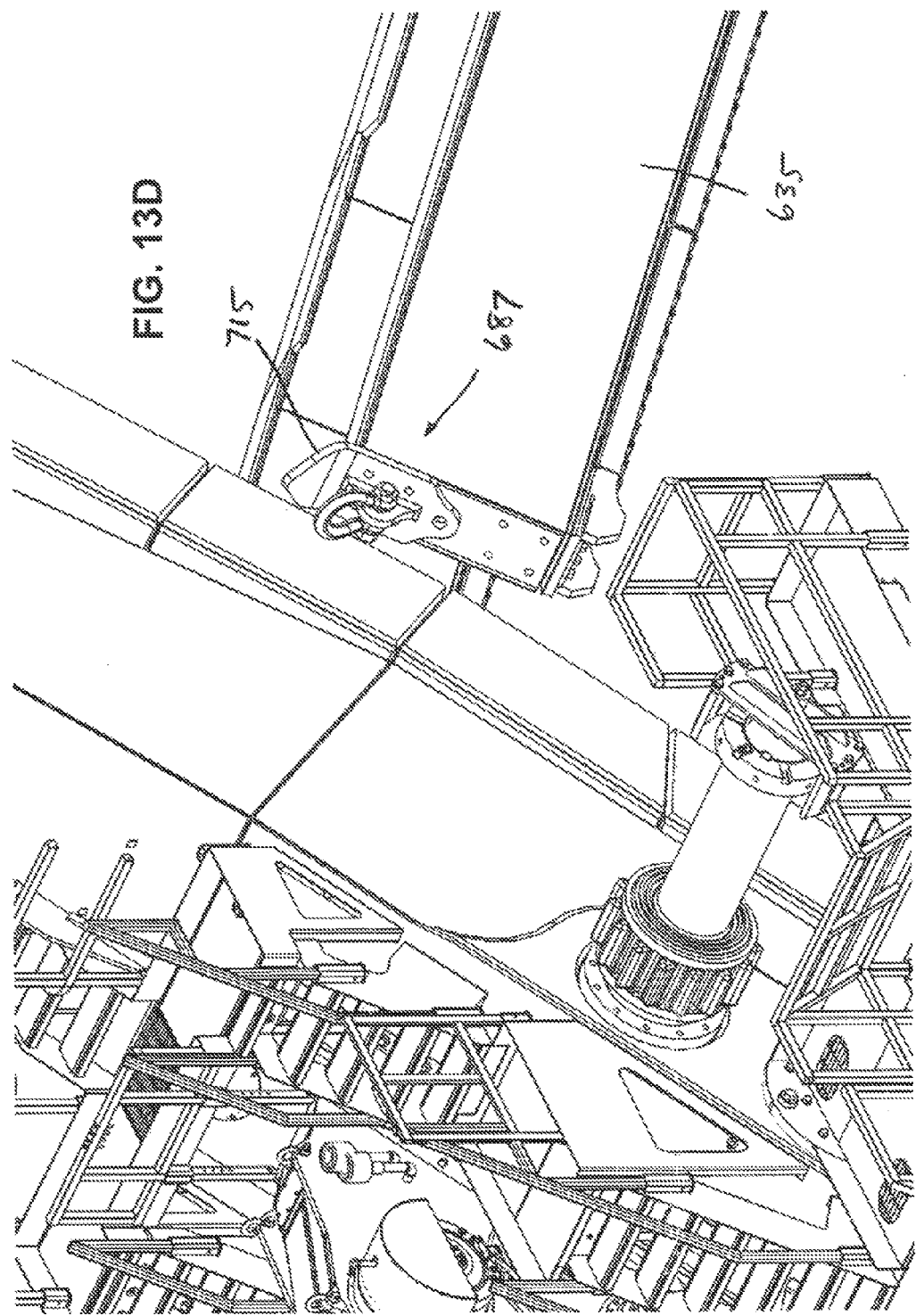

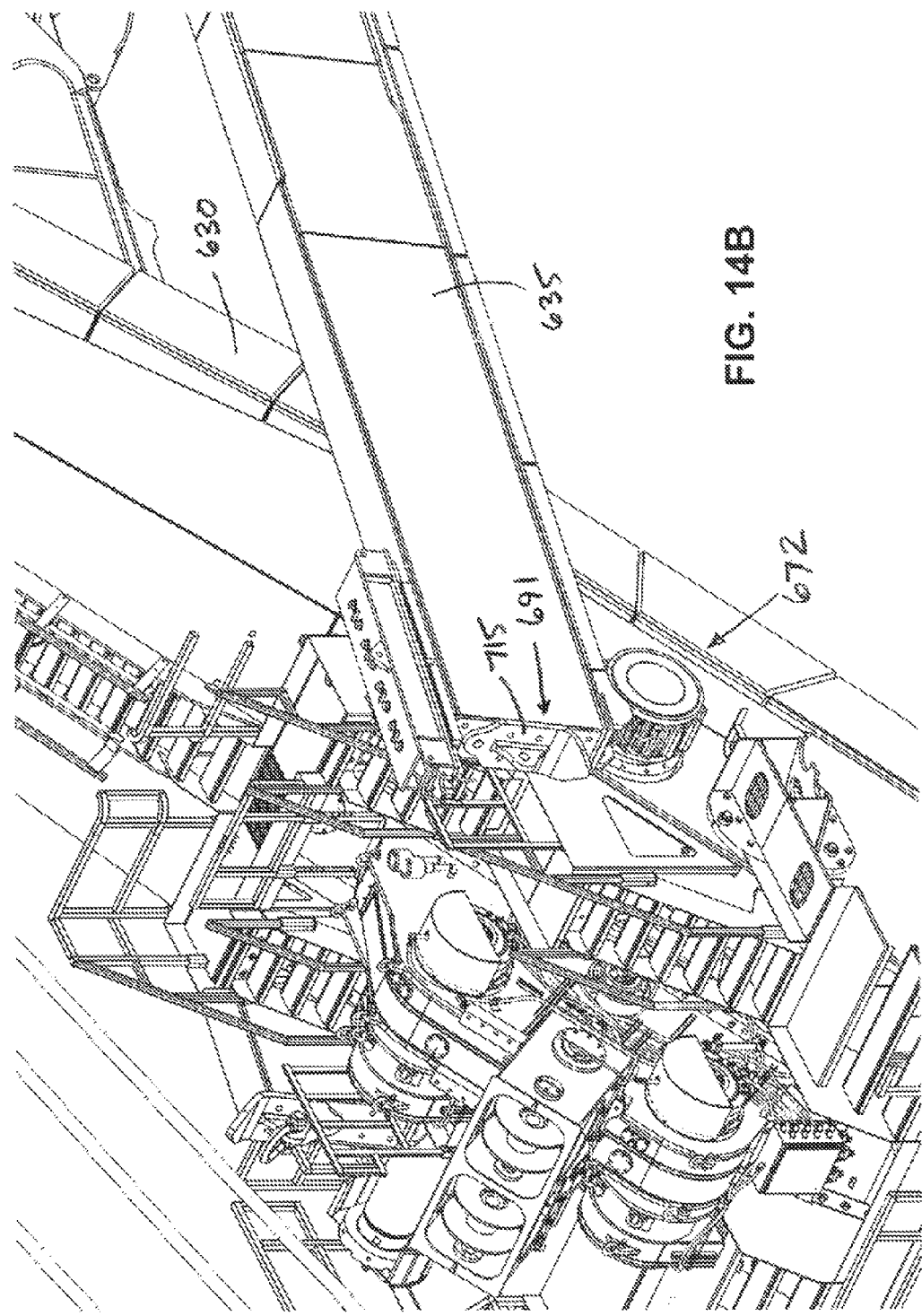

US 9,366,004 B2

EXTENDED REACH CROWD CONTROL FOR A SHOVEL

RELATED APPLICATION

The present application is a continuation of prior-filed, co-pending U.S. application Ser. No. 13/842,634, filed Mar. 15, 2013, which claims the benefit of and priority to U.S. Provisional Patent Application No. 61/686,313, filed Apr. 3, 2012. The entire contents of both of these applications are hereby incorporated by reference.

FIELD

This invention generally relates to an industrial machine, such as an electric rope or power shovel, and, more particularly, to an extended reach and a control for the extended reach for an industrial machine.

SUMMARY

Industrial machines, such as electric rope or power shovels, draglines, etc., are used to execute digging operations to remove material from, for example, a bank of a mine. An operator controls a rope shovel during a dig operation or phase to load a dipper with materials. The operator deposits the materials in the dipper into a hopper or a truck during a truck loading or truck spotting phase. After unloading the materials, the dig cycle continues, and the operator swings the dipper back to the bank to perform additional digging during a return to tuck phase.

The dipper is connected to a pivotable handle, which is attached to a boom. Multiple hoist cables and motors are used to raise and lower the dipper and extend and retract (i.e., crowd extension or retraction) the dipper. The length of the handle supporting the dipper defines the reach of the dipper, and, in existing shovels, the entire length of the handle can be used to perform each phase of the dig cycle. However, for some phases, additional reach of the dipper may be advantageous and may lead to an improved dig cycle. To provide this extended reach, the length of the handle can be extended. However, the length of the handle may be limited based on the position of hoist cables or other components of the shovel. Furthermore, for some phases of the dig cycle, extended reach of the dipper may be unnecessary, inefficient, etc. and/or create excessive loading in the structure of the machine.

Therefore, independent embodiments of the invention may allow for optimal dipper extension during the digging phase while extending available dipper reach during the truck loading or spotting phase to, for example, aid the shovel operator in properly filling the truck. For example, one independent embodiment extends the available reach of the dipper during the truck loading phase. In some embodiments, this extended reach is accomplished without extending the effective length of the handle, which often results in interference with other components of the shovel. Some embodiments use a modified handle design and geometry that includes an unsymmetrical chamfer on the handle end in place of a symmetrical rounded end.

In one independent aspect, a method of controlling an industrial machine may be provided. The industrial machine including a dipper supported by a dipper handle. The method may generally include determining an operating phase of the industrial machine, in a first operating phase of the industrial machine, limiting, with at least one controller, a reach of the dipper handle, and in a second operating phase of the industrial machine, enabling, with the at least one controller, an extended reach of the dipper handle greater than the reach in the first operating phase.

In another independent aspect, an industrial machine, such as a shovel, may generally include a dipper handle, a dipper supported by the dipper handle, and at least one controller configured to determine an operating phase of the industrial machine, in a first operating phase of the industrial machine, limit a reach of the dipper handle, and in a second operating phase of the industrial machine, enable an extended reach of the dipper handle greater than the reach in the first operating phase.

In yet another independent aspect, an assembly for an industrial machine, such as a shovel, may be provided. The assembly may generally include a dipper handle operable to support a dipper, the dipper handle having an end surface defining a first mounting position and a second mounting position, and a bracket having a first surface engageable against the end surface and an opposite, second surface, a first lifting opening being provided on the second surface, the bracket having a first end defining a guide surface and an opposite, second end, a second lifting opening being provided on the second end, the bracket being selectively connectable to the end surface of the dipper handle in the first mounting position in a first orientation relative to the dipper handle and in the second mounting position in a second orientation relative to the dipper handle.

Other independent aspects of the invention will become apparent by consideration of the detailed description and accompanying drawings.

BRIEF DESCRIPTION OF THE DRAWINGS

FIGS. 6A-6C are views of a portion of the shovel of FIG. 1B.

FIG. 8B is an enlarged view of a portion of the shovel shown in FIG. 8A with components removed to illustrate the extended reach of the dipper handle during the loading phase.

FIG. 8C is an enlarged view of the portion of the shovel shown in FIG. 8B and illustrating the hard stop limit for the handle extension.

FIGS. 9A-9B are views of the handle of the shovel shown in FIGS. 7A and 8A.

FIGS. 9C-9D are views of a portion of the handle shown in FIGS. 9A-9B.

FIGS. 10A-10D are views of a lifting bracket.

FIGS. 12A-12H are views illustrating assembly of the handle to the boom in the standing handle position.

FIGS. 13A-13D are views illustrating assembly of the handle to the boom in a lifted handle position.

FIGS. 14A-14B are perspective views of the handle and bracket and illustrating the bracket in a storage position.

DETAILED DESCRIPTION

Figure 1A:
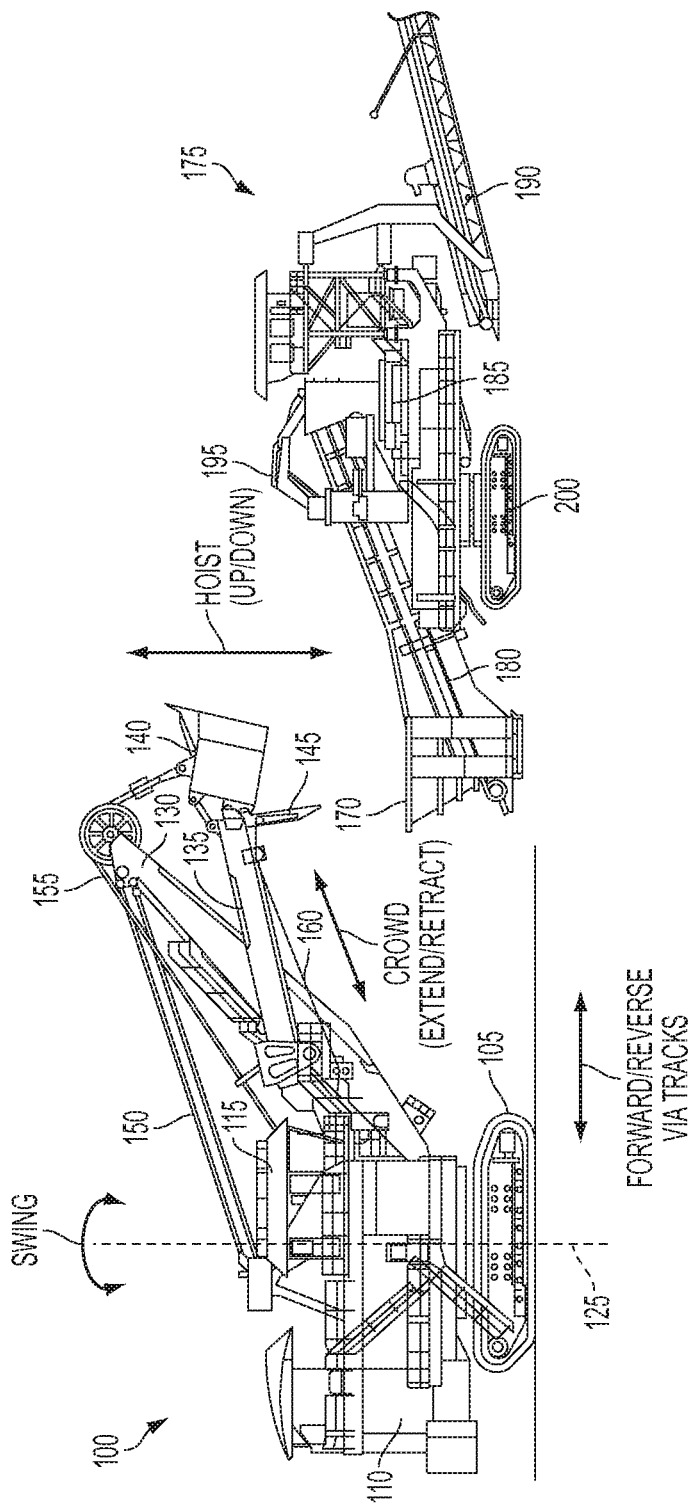
FIG. 1A illustrates a shovel according to an independent embodiment of the invention during a loading phase.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. In addition, electronic communications and notifications may be performed using any known means including direct connections, wireless connections, etc.

It should be noted that a plurality of hardware and software based devices, as well as a plurality of different structural components may be utilized to implement aspects of the invention. Furthermore, and as described in subsequent paragraphs, the specific configurations illustrated in the drawings are intended to exemplify embodiments of the invention and that other alternative configurations are possible.

FIG. 1A illustrates an industrial machine, such as, for example, a rope shovel 100. The rope shovel 100 includes tracks 105 for propelling the rope shovel 100 forward and backward, and for turning the rope shovel 100 (i.e., by varying the speed and/or direction of the left and right tracks 105 relative to each other). The tracks 105 support a base 110 including a cab 115. The base 110 is able to swing or swivel about a swing axis 125 to move from a digging location to a dumping location and back to a digging location. The rope shovel 100 further includes a boom 130 that supports a pivotable dipper handle 135 and a dipper 140. The dipper 140 includes a door 145 for dumping contents contained within the dipper 140. A door cable 160 operates the door 145.

The rope shovel 100 also includes taut suspension cables 150 coupled between the base 110 and boom 130 for supporting the boom 130 and a hoist cable 155 attached to a winch (not shown) within the base 110 for winding the cable 155 to raise and lower the dipper 140. The dipper handle 135 includes a rack tooth formation thereon which engages a drive pinion (not shown in FIG. 1A) mounted in a saddle block 157. The drive pinion is driven by an electric motor and transmission unit (not shown) to extend or retract the dipper handle 135 relative to the saddle block 157. Wear plates 158 in the saddle block 157 engage the dipper handle 135.

An electrical power source provides power to one or more hoist electric motors for driving the winch drum, one or more crowd electric motors for driving the saddle block transmission unit, and one or more swing electric motors for turning the base 110. Each of the hoist, crowd and swing motors can be driven by its own motor controller or drive in response to control signals from a controller, as described below.

Figure 1B:
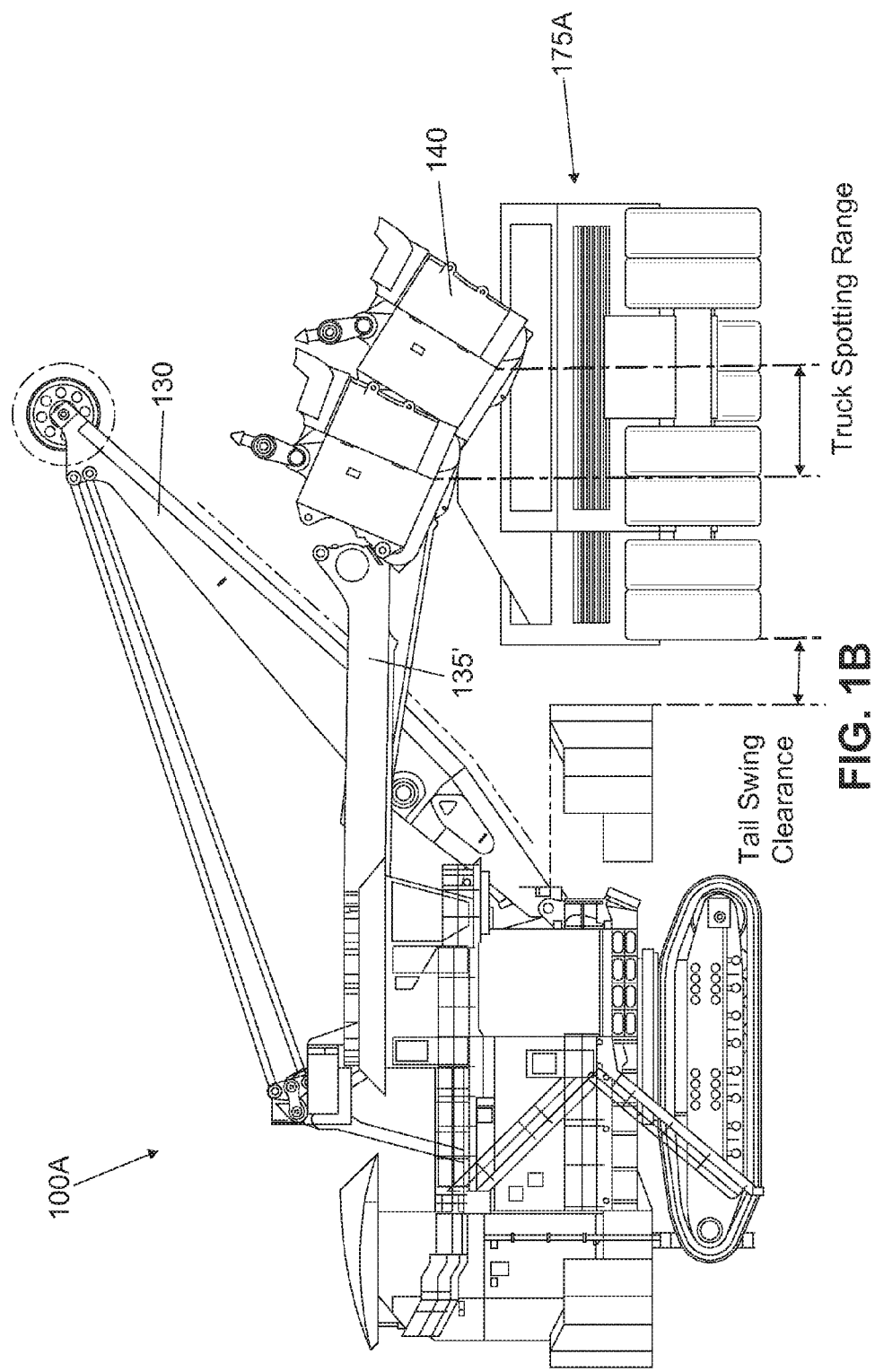
FIG. 1B is a view of an alternative construction of a shovel during a truck loading phase.

FIG. 1A also depicts a mobile mining crusher 175. During operation, the rope shovel 100 dumps materials contained within the dipper 140 into a hopper 170 of the crusher 175 by opening the door 145 when the dipper 140 is positioned over the hopper 170. As shown in FIG. 1B, a rope shovel 100A is illustrated dumping material into a dump truck 175A. Although the rope shovels 100, 100A are described as being used with the mobile mining crusher 175 or a dump truck 175A, the rope shovel 100, 100A is also able to dump materials from the dipper 140 into other material collectors or directly onto the ground.

Figure 2:
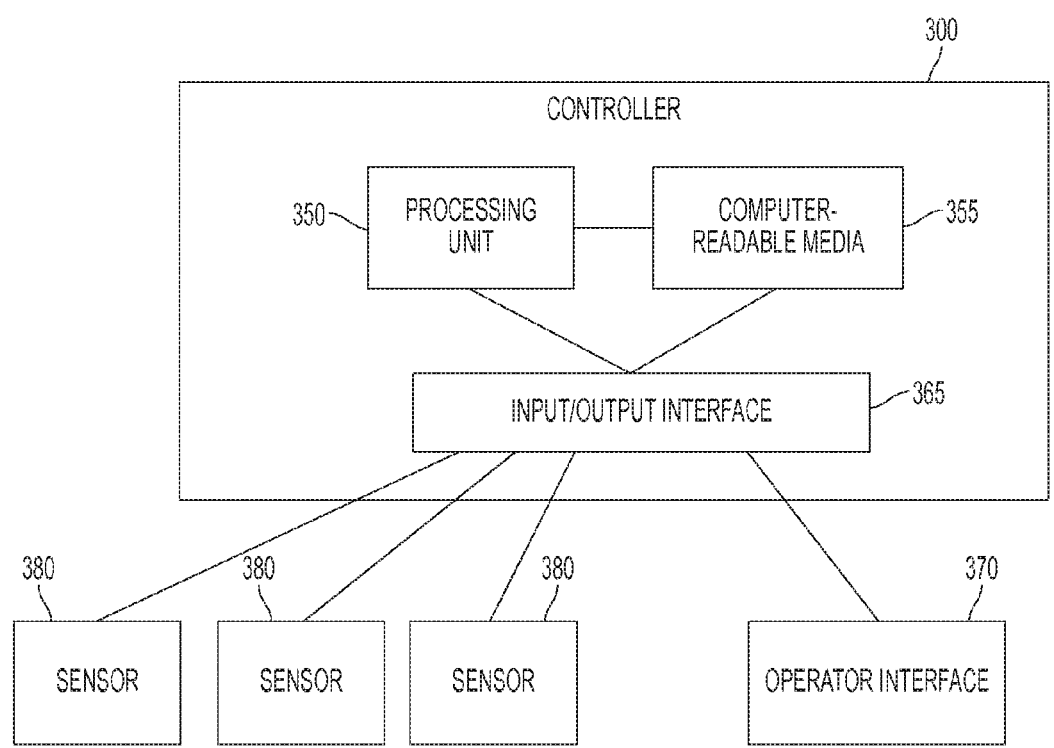
FIG. 2 illustrates a controller for the shovel of FIGS. 1A-1B.

The shovel 100 also includes a controller. The controller includes combinations of hardware and software that are operable to, among other things, control operation of the shovel 100. A controller 300 according to one independent embodiment of the invention is illustrated in FIG. 2. As illustrated in FIG. 2, the controller 300 includes a processing unit 350 (e.g., a microprocessor, a microcontroller, or another suitable programmable device), non-transitory computer-readable media 355, and an input/output interface 365. The processing unit 350, the media 355, and the input/output interface 365 are connected by one or more control and/or data buses. The control and/or data buses are shown generally in FIG. 2 for illustrative purposes. It should be understood that in other constructions, the controller 300 includes additional, fewer, or different components. It should be understood that the functionality of the controller 300 may be distributed among multiple control devices or control systems.

The computer-readable media 355 stores program instructions and data. The processing unit 350 is configured to retrieve instructions from the media 355 and execute the instructions to perform the control processes and methods described herein. The input/output interface 365 transmits data from the controller 300 to external systems, networks, and/or devices and receives data from external systems, networks, and/or devices. The input/output interface 365 stores data received from external sources to the media 355 and/or provides the data to the processing unit 350.

As illustrated in FIG. 2, the controller 300 receives input from an operator interface 370. The operator interface 370 includes a crowd control, a swing control, a hoist control, and a door control. The crowd control, swing control, hoist control, and door control include operator-controlled input devices such as joysticks, levers, foot pedals, and other actuators.

The operator interface 370 receives operator input via the input devices and outputs digital motion commands to the controller 300. The motion commands can include hoist up, hoist down, crowd extend, crowd retract, swing clockwise, swing counterclockwise, dipper door release, left track forward, left track reverse, right track forward, and right track reverse. Upon receiving a motion command, the controller 300 generally controls one or more motors or mechanisms (e.g., a crowd motor, swing motor, hoist motor, and/or a shovel door latch) as commanded by the operator.

In some embodiments, the controller 300 can also provide feedback to the operator through the operator interface 370. For example, if the controller 300 has enabled extended crowd reach (described below), the controller 300 may interact with the operator interface 370 to notify the operator of this enablement (e.g., using visual, audible, or haptic feedback).

The controller 300 is also in communication with a number of sensors 380 to monitor the location and status of the dipper 140 and/or other components of the shovel 100. For example, the controller 300 can be coupled to crowd sensors, swing sensors, hoist sensors, and shovel sensors. The sensors 380 may also include weight sensors, acceleration sensors, inclination sensors, loadpin strain gauges, gantry pins, motor field modules, etc. to provide additional information to the controller 300 relating to one or more operating conditions and/or characteristics of the shovel 100 and/or of the dipper 140.

The crowd sensors indicate the level of extension or retraction of the dipper 140. The swing sensors indicate the swing angle of the handle 135. The hoist sensors indicate the height of the dipper 140 based on position of the hoist cable 155. The shovel sensors indicate whether the dipper door 145 is open (for dumping) or closed and may also include weight sensors, acceleration sensors, and inclination sensors to provide additional information to the controller 300 about the load within the dipper 140.

In some embodiments, one or more of the crowd sensors, swing sensors, and hoist sensors are resolvers that indicate an absolute position or relative movement of the motors used to move the dipper 140 (e.g., a crowd motor, a swing motor, and/or a hoist motor). For example, for indicating relative movement, as the hoist motor rotates to wind the hoist cable 155 to raise the dipper 140, the hoist sensors output a digital signal indicating an amount of rotation of the hoist and a direction of movement. The controller 300 translates the sensor outputs to a height/position, speed, and/or acceleration of the dipper 140.

A hoist drive module, a crowd drive module, and a swing drive module are configured to receive control signals from, for example, the controller 300 to control hoisting, crowding, and swinging operations of the shovel 100. The control signals are associated with drive signals for hoist, crowd, and swing motors of the shovel 100. As the drive signals are applied to the motors, the outputs (e.g., electrical and mechanical outputs) of the motors are monitored and fed back to the controller 300 (e.g., via field modules). The outputs of the motors include, for example, motor speed, motor torque, motor power, motor current, etc. Based on these and other signals associated with the shovel 100 (e.g., signals from the inclinometer), the controller 300 is configured to determine or calculate one or more operational states or positions of the shovel 100 or its components. In some embodiments, the controller 300 determines a dipper position, a dipper handle angle or position, a hoist wrap angle, a hoist motor rotations per minute ("RPM"), a crowd motor RPM, a dipper speed, a dipper acceleration, etc.

Figure 3:
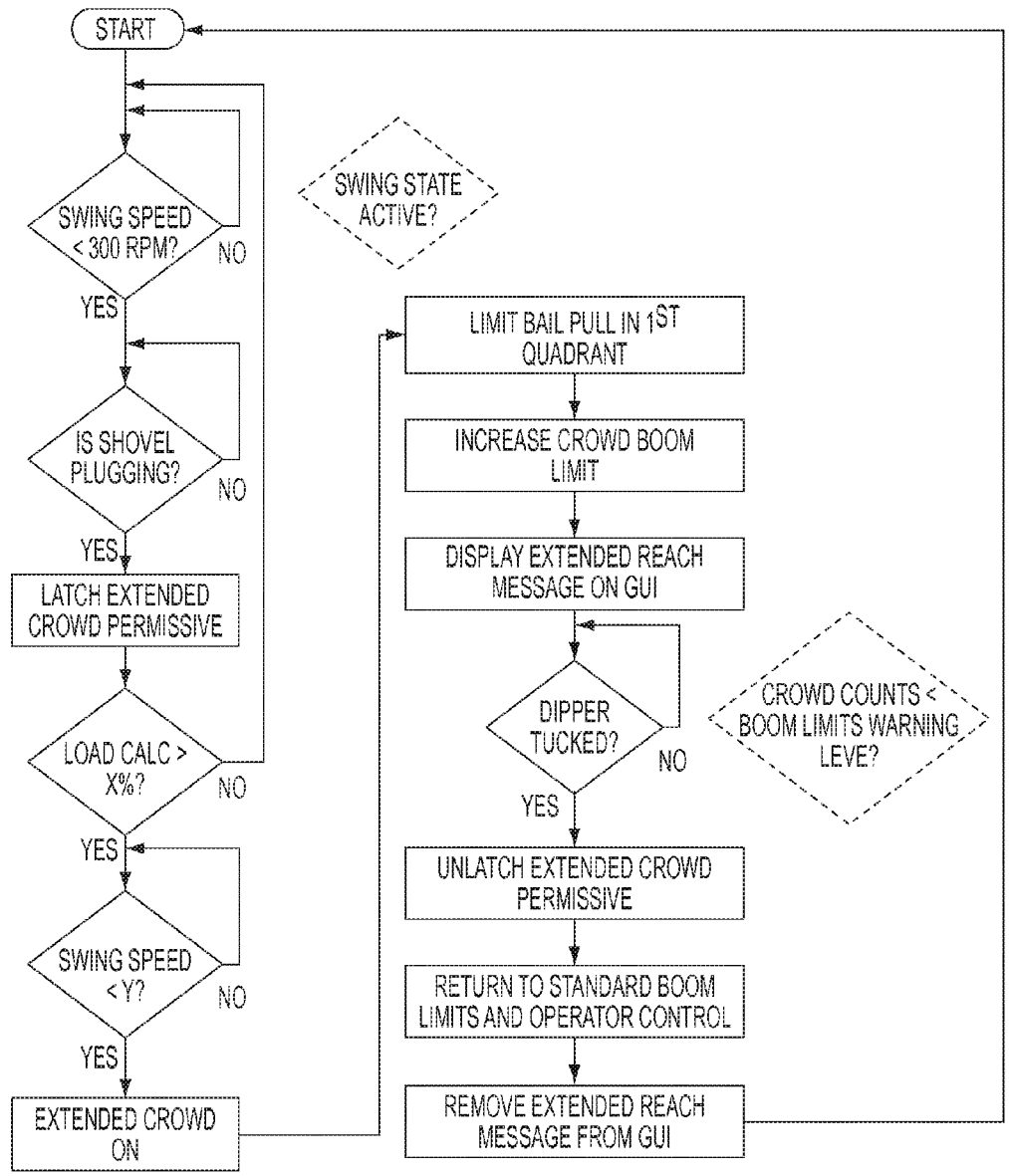
FIG. 3 is a flow chart illustrating a control method executed by the controller of FIG. 2.

As noted above, the controller 300 is configured to retrieve from the media 355 and execute instructions related to control processes and methods for the shovel 100. For example, FIG. 3 illustrates a control method 400 performed by the controller 300 based on instructions executed by the processor 350 to provide additional crowd reach during the truck loading phase of the dig cycle. As noted above, the length of the handle 135 defines the reach of the dipper 140, and, in existing shovels, the entire length of the handle 135 can be used to perform each phase of the dig cycle. However, for some phases, the optimal reach of the dipper 140 may vary based on the current phase of the dig cycle. In particular, additional dipper 140 reach may be advantageous during the truck loading phase to ensure proper loading of the dump truck or mobile crusher.

Therefore, as represented by the method 400 illustrated in FIG. 3, the controller 300 can provide or enable additional dipper reach during the truck loading phase of the dig cycle. The method 400 uses feedback from the shovel sensors 380 (e.g., the swing and crowd sensors) to determine a current phase of the dig cycle and controls dipper reach accordingly. In particular, as the swing motor speed passes a baseline set-point (e.g., about 300 RPM), the controller 300 begins to monitor and determines when plugging (e.g., decelerating to stop swinging movement of the base 110) begins. Alternatively or in addition to using a baseline set-point for swing speed, the controller can monitor the current shovel state to determine when the shovel 100 has transitioned to a "swing state".

When the shovel 100 is plugging, the controller 300 can perform an optional check of the dipper load (optional and alternative steps for the method 400 are illustrated in FIG. 3 with a dashed line). The hoist load calculation is checked to determine if the dipper 140 is empty. If the dipper 140 is empty, no extended crowd reach is needed as no materials are available for depositing during a truck loading phase.

Figure 4:
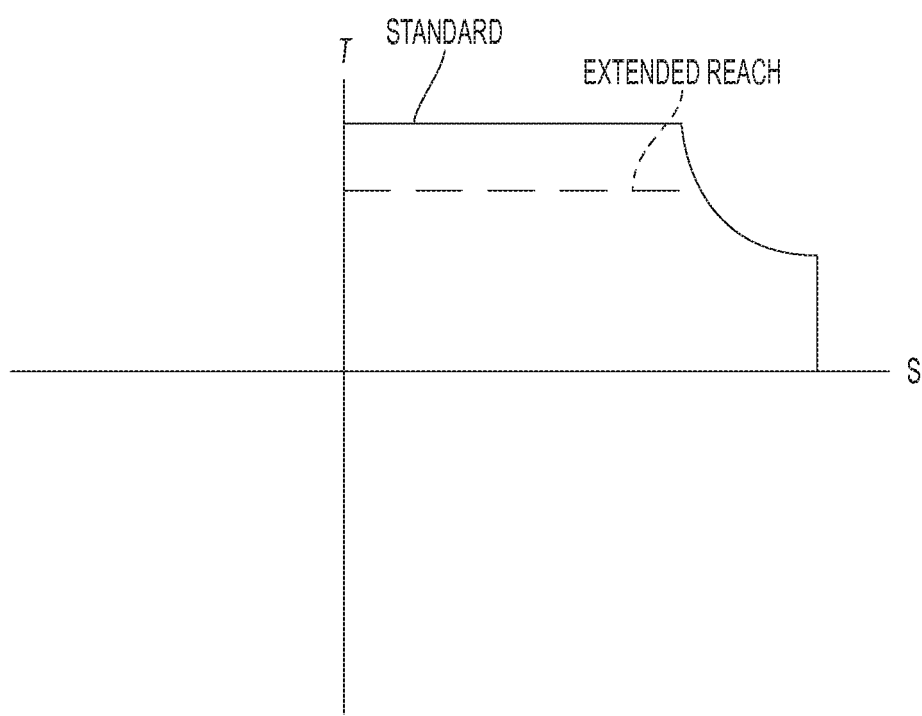
FIG. 4 graphically illustrates limiting bail pull.

If the dipper 140 is not empty (e.g., a dipper load equal to or greater than about 25% of maximum payload) and while the shovel is plugging, the controller 300 (e.g., continuously) monitors swing speed to determine when swing speed has slowed to a minimal level. The minimal level indicates that the operator has reached the mobile crusher 175, the dump truck 175A or other location for dumping material. At this point, the controller 300 enables the extended reach and limits hoist bail pull (e.g., to between 75% and 95% of standard hoist bail pull when in a motoring only condition (not generating torque)) in quadrant 1 (i.e., positive torque and speed—see FIG. 4) to minimize overturning tipping moment. The controller 300 then increases the existing boom limits to allow for extended reach of the crowd motion of the dipper 140. The controller 300 can also display a message alerting the operator that extended reach of crowd motion is currently enabled (e.g., via a message in a GUI provided by the operator interface 370).

After the extended crowd reach is enabled, the controller 300 monitors crowd position to determine when the operator has retracted the dipper 140 back inside the standard boom limits profile. At this point, the controller 300 disables extended crowd reach and returns the shovel 100 to standard production parameters. Alternatively or in addition to determining when the operator has retracted inside standard boom limits, the controller 300 can monitor the shovel states and disable the extended reach and reset shovel parameters when the operator enters the "dig prep state" or "tuck state".

In some embodiments, the controller 300 can also enable the extended crowd reach based on other sensors or control systems or methods. For example, in some arrangements, the controller 300 can sense the position of the hopper 170 of the mobile crusher 175 or of the dump truck 175A (or receive positional information from a separate controller or sensor) and enable the extended crowd reach when the shovel 100 is positioned by the mobile crusher/dump truck for loading and/or when extended crowd reach is useful for optimal load placement.

In some independent embodiments, the method 400 illustrated in FIG. 3 can be used with a modified dipper handle 135'. FIGS. 5A-5B and 6A-6C illustrate the handle 135' for a shovel 100, 100A. The illustrated handle 135' can extend the reach of the dipper 140 approximately 18 inches without an effective increase in the overall handle weight or length.

Lengthened handles can interfere with the gantry platform on the cab 115 (e.g., in some situations, there is only approximately 1 inch of clearance between the end of the handle and the gantry hand rail on the cab 115 (see FIG. 6C)). To overcome these issues while still providing extended dipper reach, the handle 135' includes an extended rack length while unused portions at the end of the handle 135' are removed.

Figure 5A:
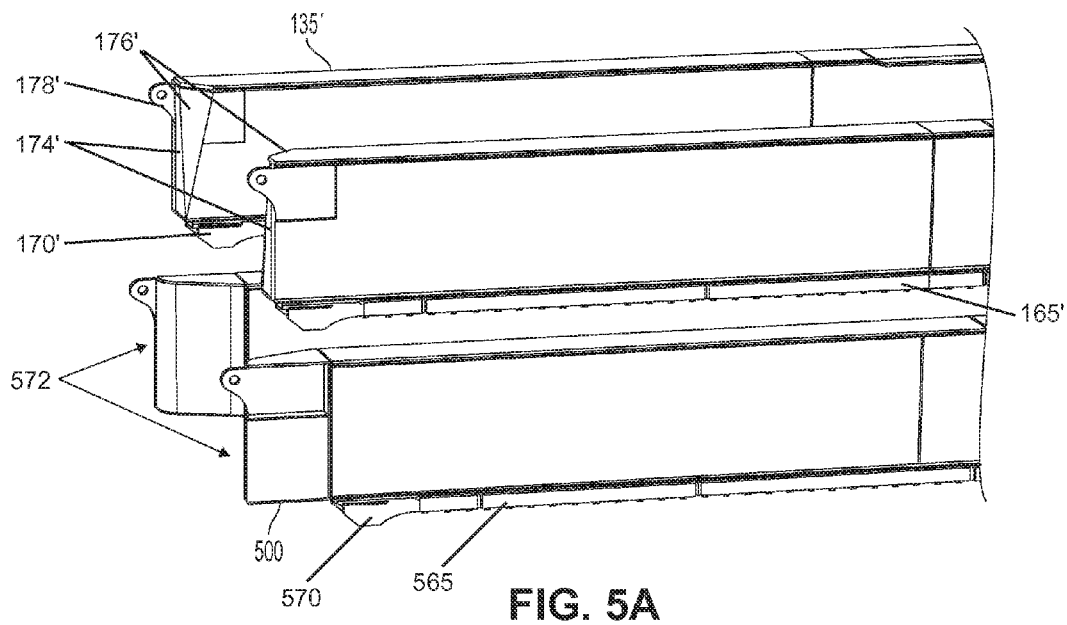
FIG. 5A is a perspective view of a portion of a modified handle for the shovel of FIGS. 1A-1B and of a portion of an existing handle.
Figure 5B:
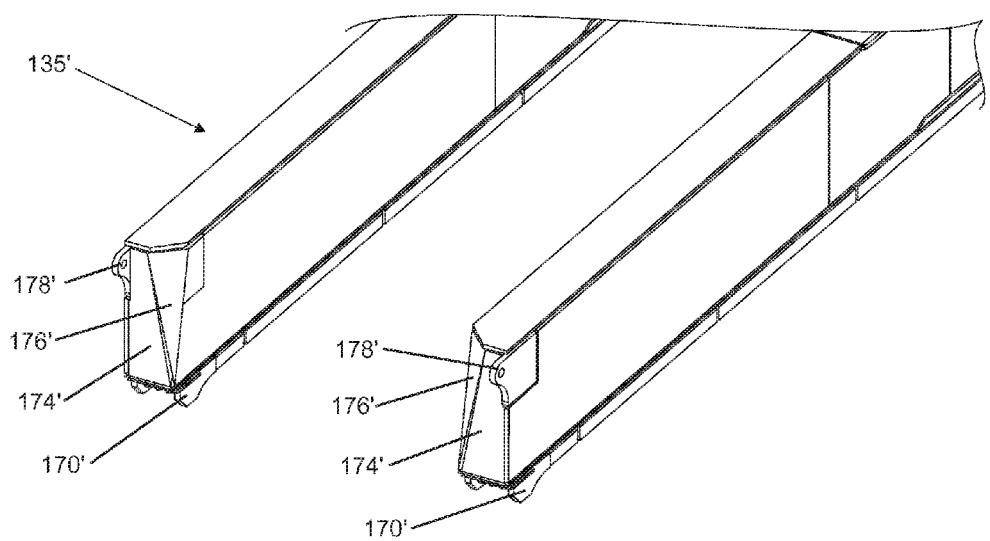
FIG. 5B is another perspective view of the portion of the modified handle shown in FIG. 5A.

For example, as shown in FIG. 5A, as compared to an existing handle design 500 (below in FIG. 5A), the handle 135' (above in FIG. 5A) does not include the end part to the rear of the rack 165' and greenhorn 170' as the existing handle 500 does (the end part 572 to the rear of the rack 565 and the greenhorn 570). This end part 572 provides little or no functional support or guidance of the handle 500. The handle 135' does not include this part and, thus, uses this removed structure to increase the length of the rack 165' relative to the length of the handle 135'.

Figure 5C:
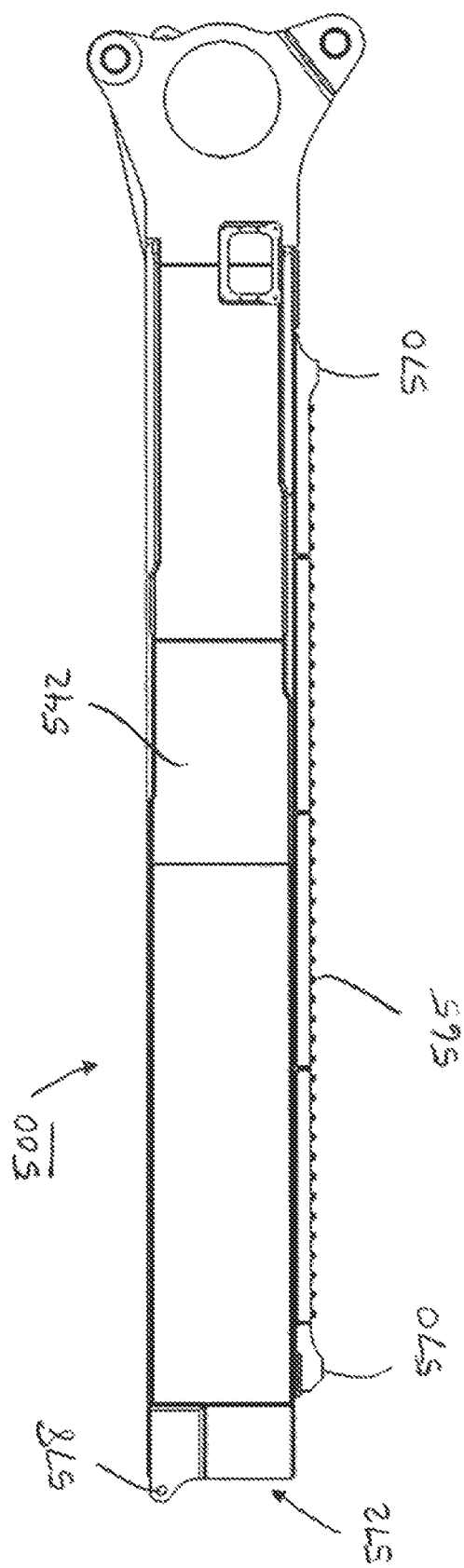
FIG. 5C is a side view of the existing handle shown in FIG. 5A.
Figure 6B:
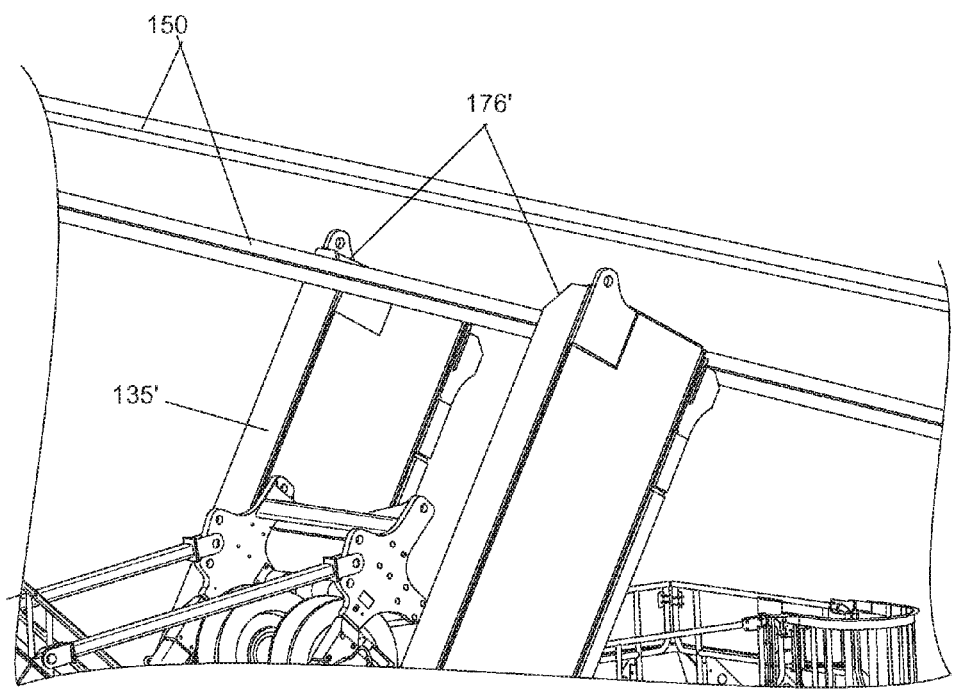
Figure 6C:
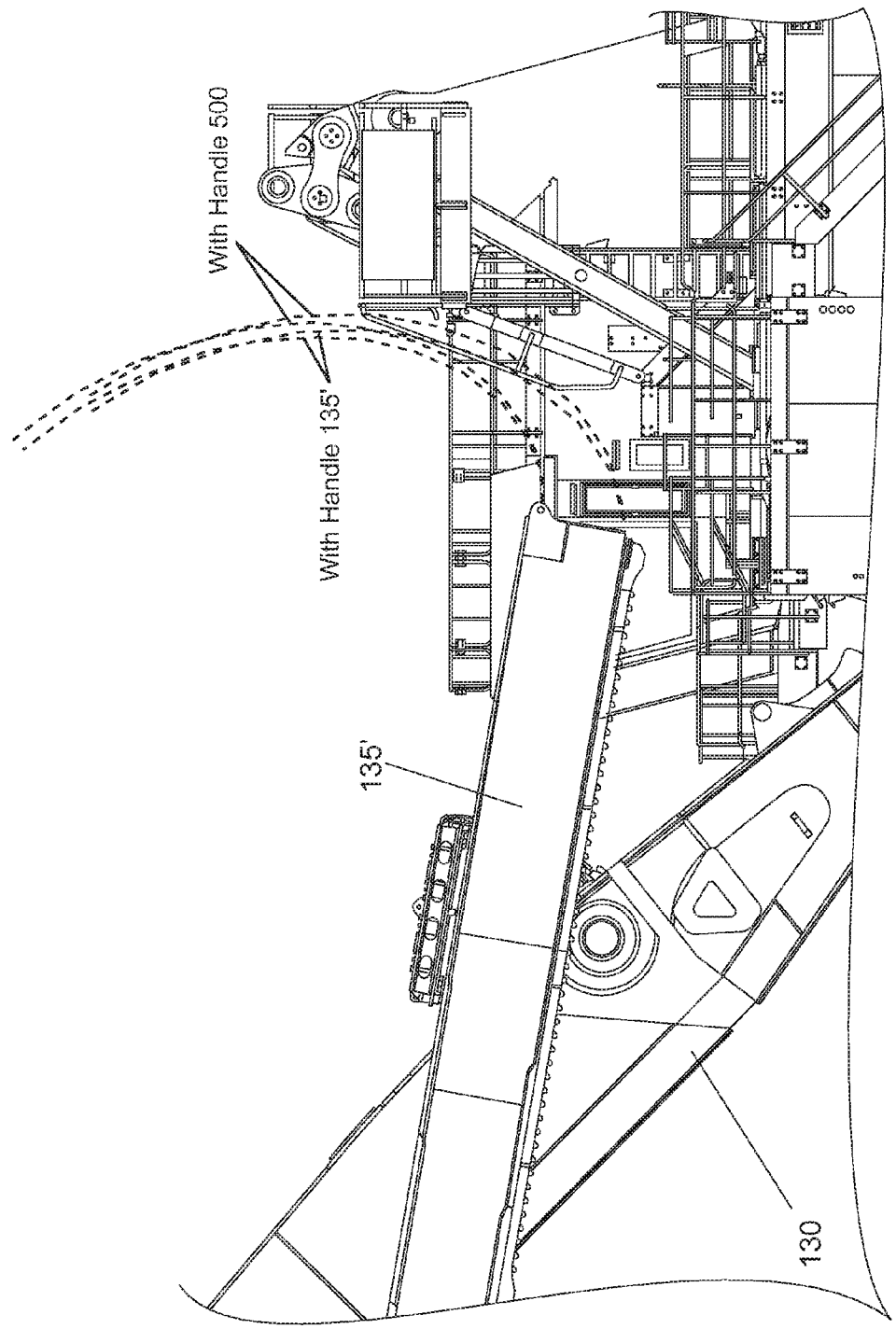

As also illustrated in FIGS. 5A-5B and 6A-6C, the ends 174' of the handle 135' are tapered (at 176') to account for possible suspension rope or hoist cable collisions. Previous handle designs (such as the handle 500 shown in FIGS. 5A and 5C) are symmetrical top to bottom although collisions with suspension ropes primarily occur at the top of the handle. Therefore, to limit or minimize the impact of collisions, the handle 135' includes an unsymmetrical chamfer 176' on the handle end 174' in place of a symmetrical rounded end 572 of the existing handle 500.

In addition, as noted above, the rack length of the handle 135' is increased approximately 18 inches. However, with the removal of the handle end 572, the overall handle length is actually shortened by approximately 7 inches. Therefore, the handle 135' provides extended reach of the dipper 140 with a shortened handle. In some arrangements, the handle 135' thus allows for an approximately 8-inch clearance between the handle 135' and the gantry guard rail (e.g., when the handle torsion box touches the boom 130 (see FIG. 6C)).

Also, in some embodiments, in addition to or as an alternative to using the handle 135', the boom 130 can also be modified to allow the shipper shaft to be moved rearward while continuing to provide truck loading dipper range operators are accustomed to.

It should be understood that the modified handle 135' is not required to use the control method described above (e.g., see FIG. 3 and method 400). In particular, the control method can be used to limit and extend the reach of the dipper 140 based on the current phase of the dig cycle regardless of the design or geometry of the handle or the shovel.

FIGS. 7A-7C and 8A-8C illustrate an alternative construction for a modified dipper handle 635 for a dipper 600. FIGS. 9A-9D provide more detailed views of the handle 635. As shown in FIG. 9B, the handle 635 includes spaced apart arms 642 connected by a mount 645 for the dipper 140 (see FIGS. 7A and 8A). A rack 665 (see FIG. 9A) is formed on the bottom surface of each arm 642 and extends between end structure 670 (a removable rear greenhorn 670 and a front rack termination 670). The rack 665 is engageable with a drive pinion 672 (see FIG. 7C) driven by crowd motor and transmission unit (not shown) to extend and retract the handle 635 and attached dipper 640 (see FIG. 7A).

As shown in FIGS. 9C-9D, each arm 642 has a generally planar end surface 680. Mounting positions 685 (see FIG. 9D), including an upper or first mounting position 687, a lower or second mounting position 689 and an intermediate mounting position 691, are provided on each end surface 680. The mounting positions 685 include fastener receiving openings 695 defined in the end surface 680. The mounting positions 685 are described below in more detail.

Figure 7A:
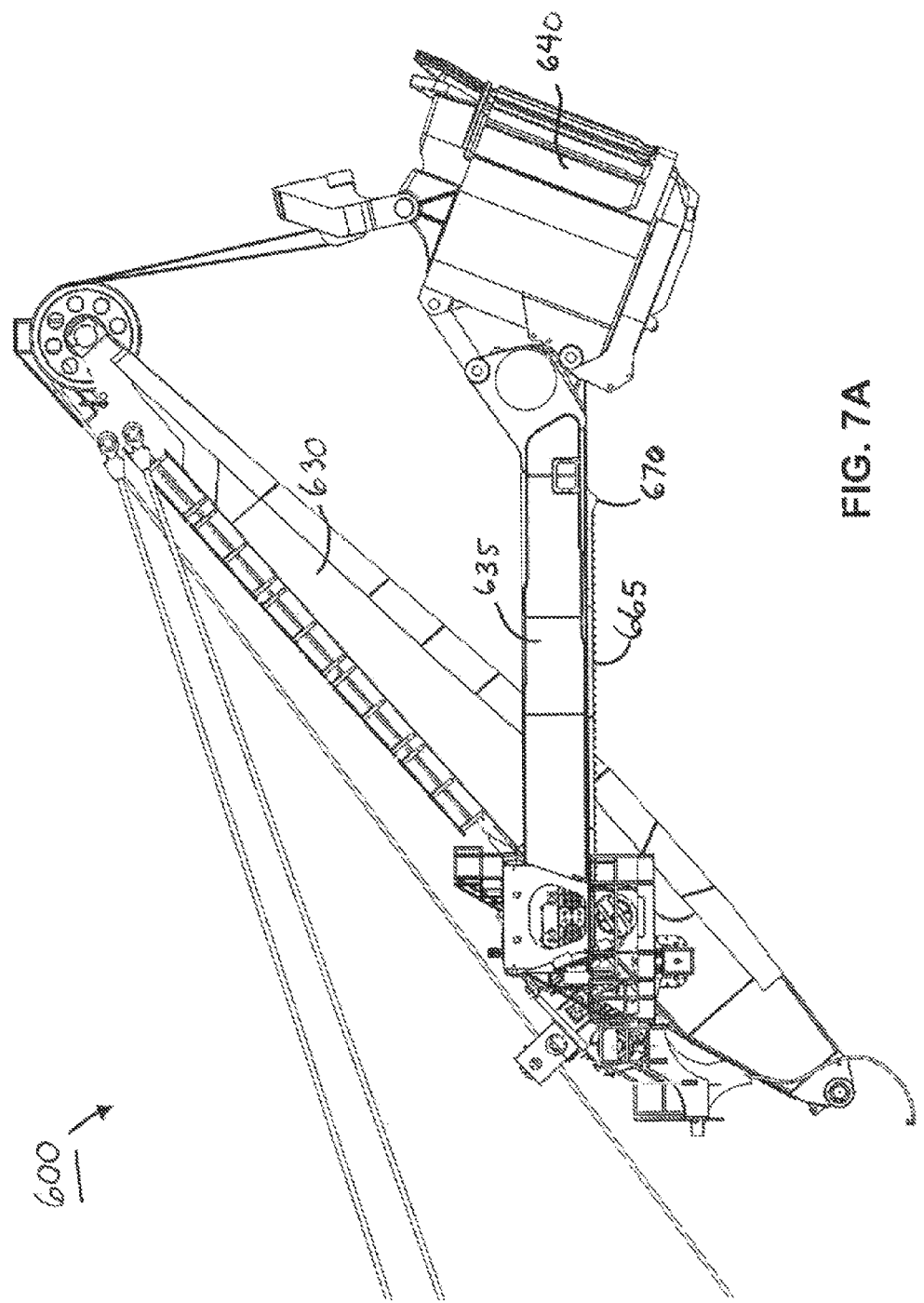
FIG. 7A is a side view of a portion of another alternative construction of a shovel and illustrating limited reach of a dipper handle during a digging phase.
Figure 7B:
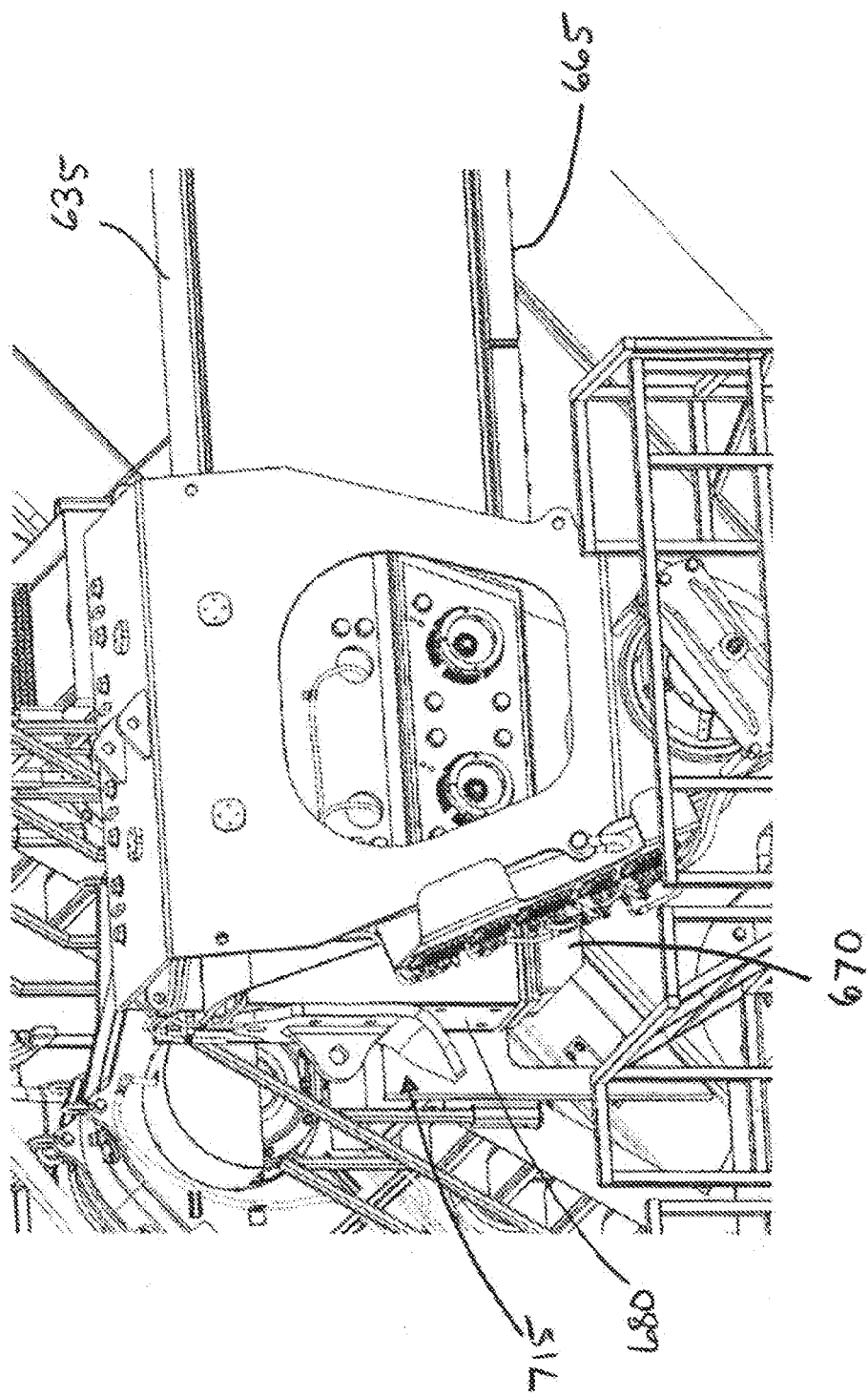
FIG. 7B is an enlarged perspective view of a portion of the shovel shown in FIG. 7A.
Figure 7C:
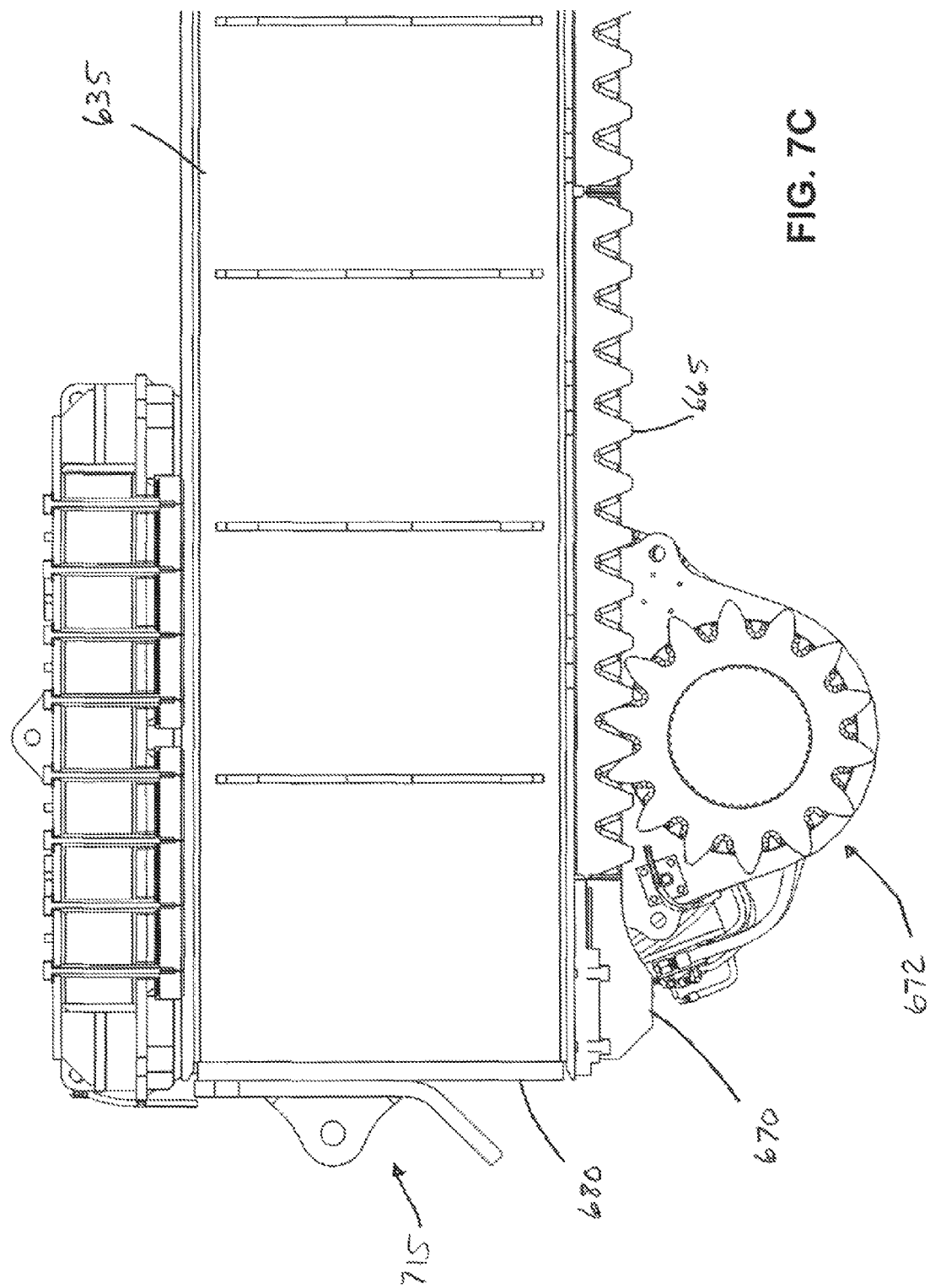
FIG. 7C is an enlarged view of the portion of the shovel shown in FIG. 7B with components removed to illustrate the limited reach of the dipper handle during the digging phase.

In FIG. 7A, the shovel 600 is illustrated during a digging phase with the handle 635 fully crowded for digging. As discussed above, the shovel 600 is controlled by controller 300 and method 400 to limit the reach of the handle 635 in certain operating phases of the shovel 600, such as the digging phase (a "limited reach" phase). As shown in more detail in FIGS. 7B-7C, at least about 18 inches of the rack 665 (three teeth on the rack 665 or about 19.5 inches in the illustrated construction) remains in this limited reach operating phase. In general, other than the loading phase (see FIGS. 8A-8B), the operating phases of the shovel 600 are limited reach operating phases.

Figure 8A:
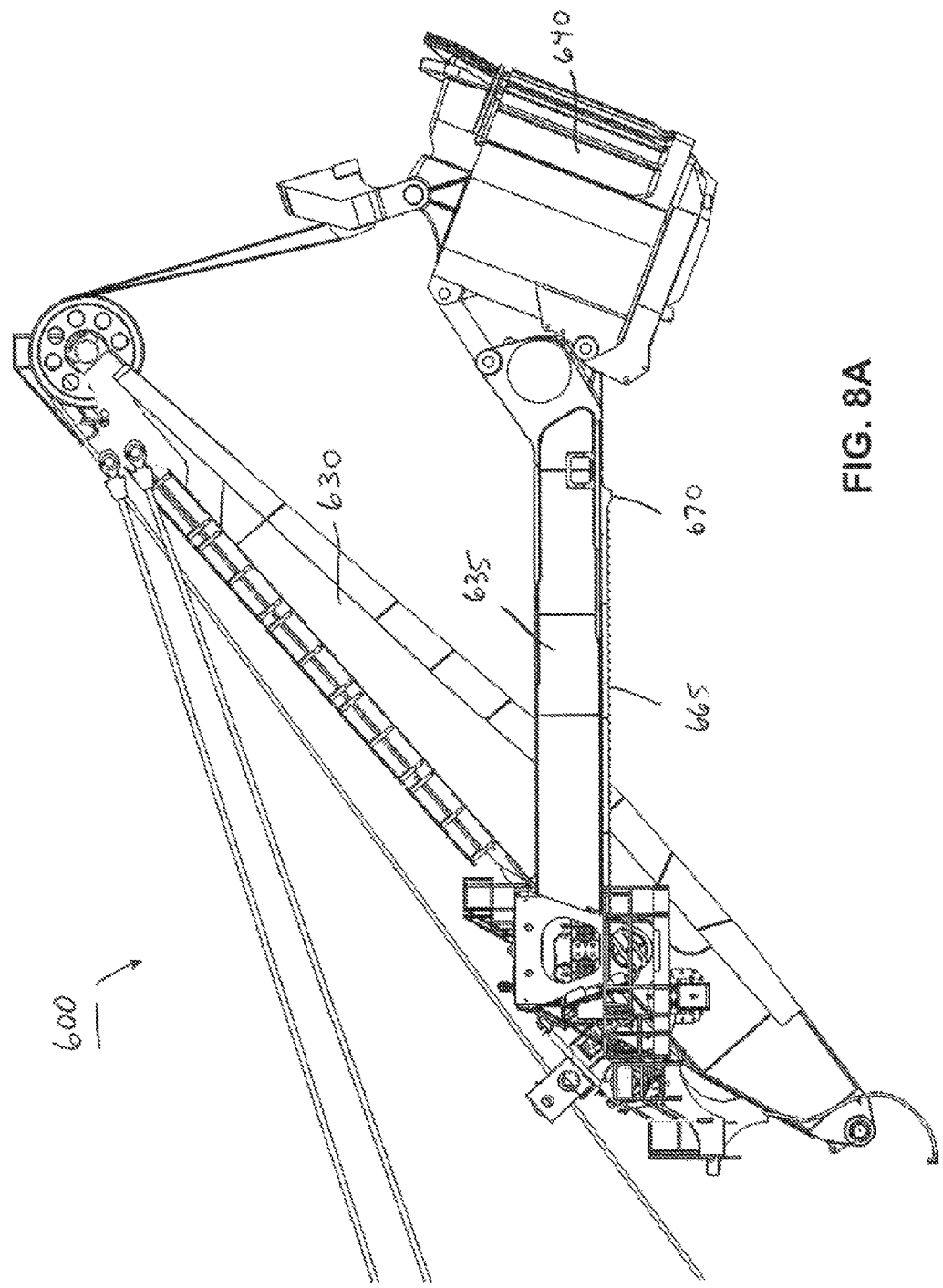
FIG. 8A is a side view of the portion of the shovel shown in FIG. 7A and illustrating extended reach of the handle during a loading phase.

In FIG. 8A, the shovel 600 is illustrated during a loading phase with the handle 635 fully extended for loading (with "extended reach"). As discussed above, when the loading phase is determined, the controller 300 enables extended reach of the handle 635 (the extended reach phase), and, as shown in FIG. 8B, the handle 635 may be fully extended to use the full rack 665 substantially all the way to the greenhorn 670 (until the rear end of the handle 635 is approximately in line with the rear end of the wear plate 158). Further extension of the handle 635 is limited by the greenhorn 670 (see FIG. 8C) as a hard stop limit.

In the illustrated construction (see FIG. 9A), the modified handle 635 (about 466.875 inches from the pin connection to the dipper 140 to the plane of the end surface 680) is slightly shorter than (see FIG. 5C) the existing handle 500 (about 473.875 inches). However, the usable rack length of the handle 635 (about 323.68 inches) is longer than the usable rack length of the handle 500 (about 301.50 inches). Also, the rear end of the rack 665 of the handle 635 is closer to the end surface 680 (about 22.56 inches) than the rear end of the rack 535 of the handle 500 (about 49 inches). Finally, the rear greenhorn 670 is positioned at the rear end of the handle 635 (only about 0.5625 inches from the plane of the end surface 680) while the rear greenhorn 570 of the handle 500 is farther from the end (about 27 inches) (each rear greenhorn 670, 570 has a length of about 22 inches).

In other constructions (not shown), the modified handle 635 and/or rack 665 may have a different construction/relative location which is still improved over the existing handle 500 and/or rack 565. For example, in some constructions, the length of the rack 665 may be at least 65% of the length of the handle 635.

As another example, in some constructions, the distance between the rear end of the usable rack length and the end surface 680 may be less than 10% or less than 5% of the length of the handle 635. Also, in some constructions, the distance between the rear end of the usable rack length may be less than 15% or less than 10% of the length of the rack 665. In some constructions, the distance between the rear end of the rear greenhorn 670 and the end surface 680 may be less than or significantly less than the length of the greenhorn 670.

In some independent aspects, the shovel 100 may also include (see FIGS. 10-14) a bracket assembly 710 for use with the handle 635. The bracket assembly 710 includes one or more brackets 715, each connectable to a handle arm 642 in one or more orientations.

As shown in FIGS. 10A-10D, each bracket 715 generally includes a body 720 having opposite surfaces 725, 730. One surface 725 is engageable against the end surface 680 of a handle arm 642, and a lifting opening 735 is provided on the surface 730.

The body 720 also has opposite ends 740, 745. A guide 750, provided at one end 740, is operable, when installed, to guide the dipper handle 635 during installation with the boom 630 (see, e.g., FIGS. 12A-12H and 13A-13D). The guide 750 is provided by a non-planar portion 755 angled relative to the generally planar remainder of the body 720. A guide surface 760 is provided along the edge of the guide 750. Another lifting opening 765 is provided at the opposite end 745. Each bracket 715 may be formed of a single piece body 720 bent to provide the portion 755 and with the structure of the lifting opening 735 fixed to the surface 730 (e.g., by welding).

Fastener-receiving openings 770 (see FIGS. 10A and 10C) are provided in the body 720. The openings 770 are located to correspond to positions of the openings 695 of the mounting positions 685. Fasteners 775 extend through the openings 770, 695 to connect the bracket 715 to the handle arm 642 in a desired mounting position 685 and orientation.

FIGS. 11-14 illustrate installation and use of the bracket(s) 715 with the dipper handle 635 and installation of the dipper handle 635 to the shovel 600. In FIG. 11A, the handle 635 is positioned on its side in a transport position (e.g., for transport on a rail car). A bracket 715 is connected to the upper dipper arm 642 in the first mounting position 687 and in a transport removal orientation. In this orientation, the bracket 715 extends transverse to the arm 642 with the second end 745 and lifting opening 765 projecting above the side of the arm 642. A clevis 800 is shown connected to the lifting opening 765 and is connected to a crane (not shown) to lift the handle 635 from the transport. With the bracket 715 in the illustrated mounting position 687 and orientation, the handle 635 is rotated to a horizontal position (see FIG. 11B).

Figure 11A:
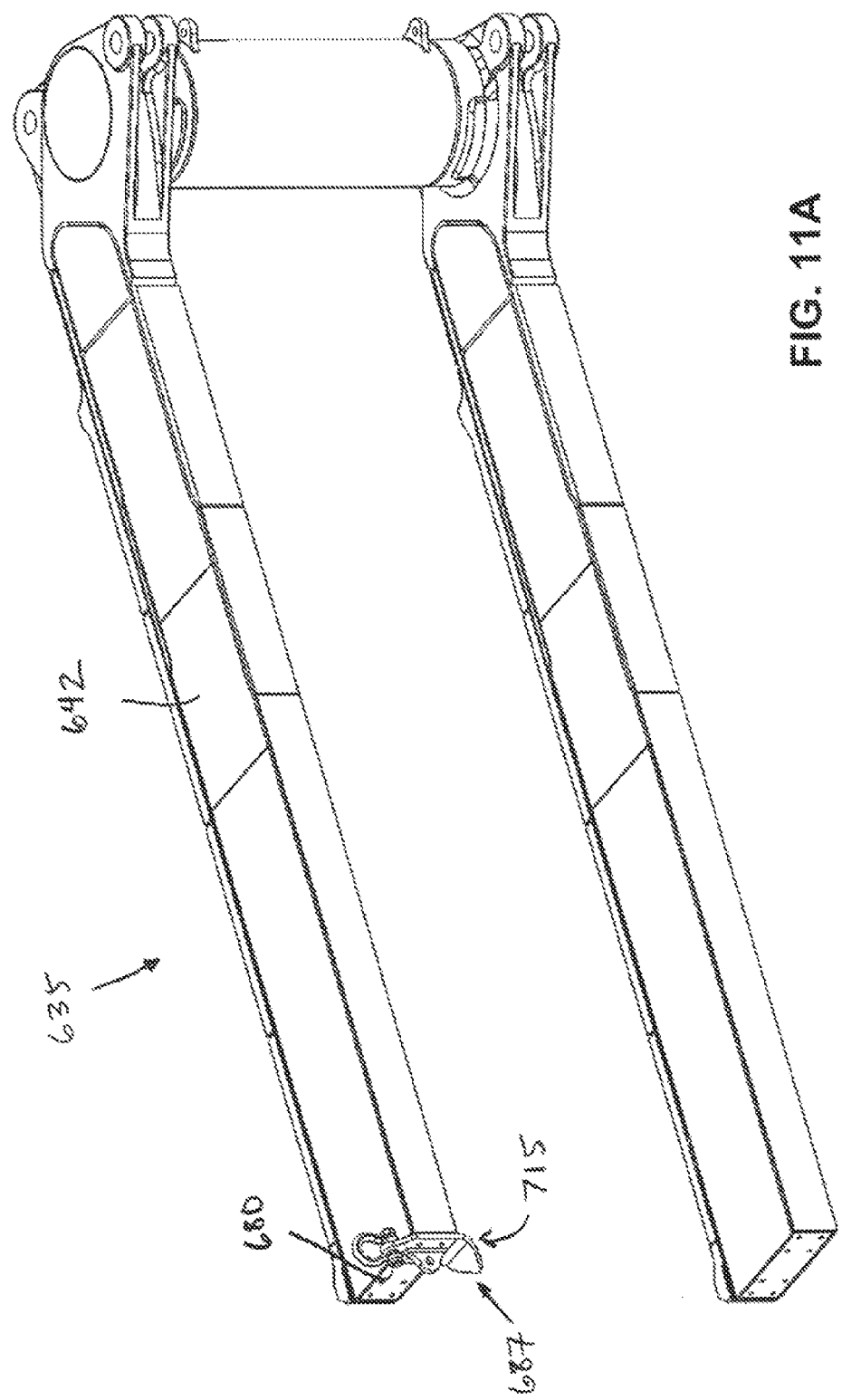
FIGS. 11A-11B are perspective views of the handle shown in FIGS. 9A-9D including the lifting bracket shown in FIGS. 10A-10D and illustrating a transport removal position of the bracket.
Figure 11B:
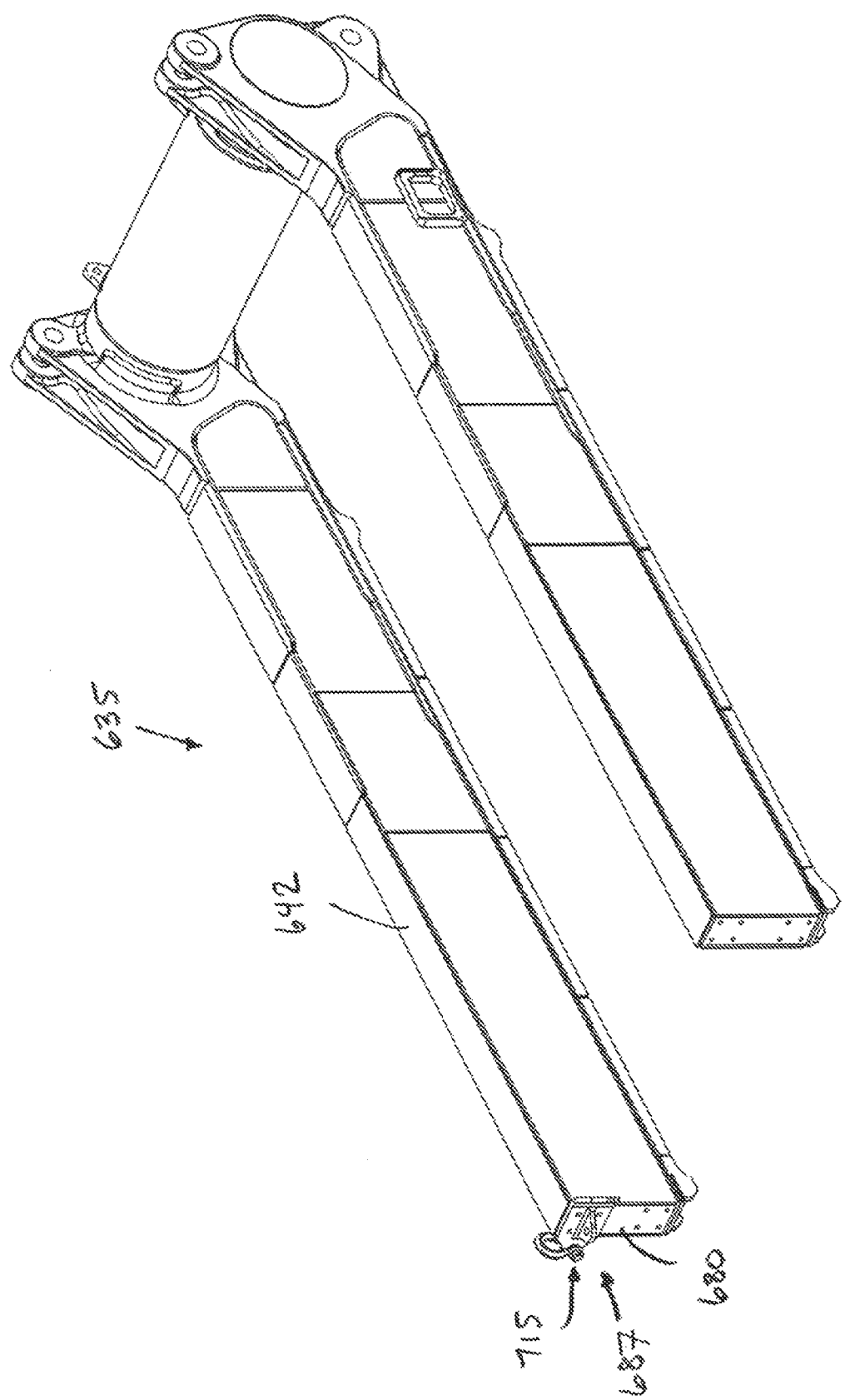
Figure 11C:
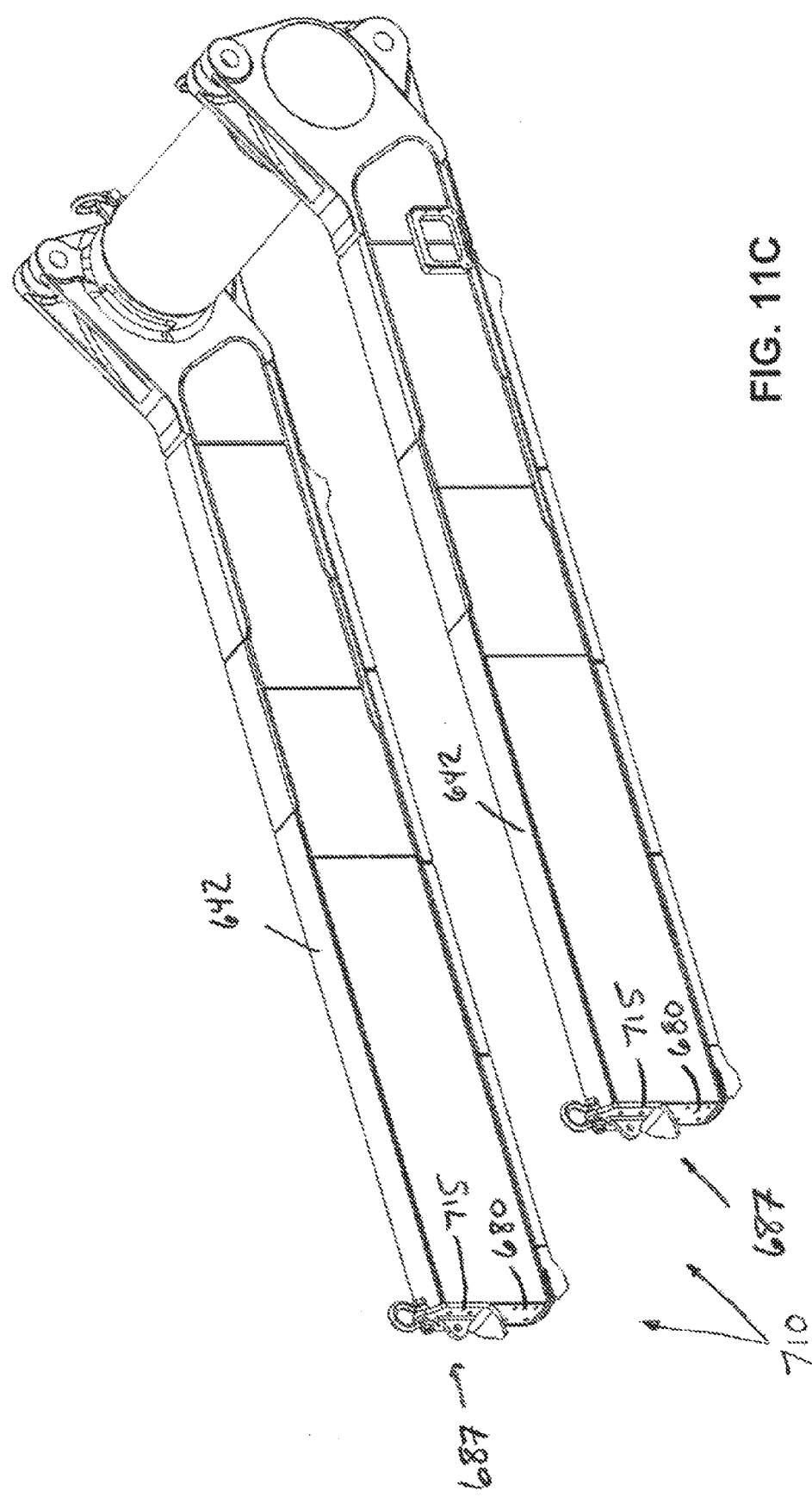
FIG. 11C is a perspective view of the handle and brackets and illustrating a standing position of the brackets.

In some situations (see FIGS. 12A-12H), the handle 635 is installed in a "standing" position in which the dipper 640 is positioned on the ground with the handle 635 extending upwardly. In FIG. 11C, each bracket 715 is connected to an arm 642 in the first mounting position 687 and in a pivoted second orientation (a "standing" position of the brackets 715). In this position/orientation, each bracket 715 is generally aligned with the arm 642, and the second end 745 and the lifting opening 765 project above the top of the arm 642. The handle 635 is lifted from the position shown in FIG. 11C to the position shown in FIGS. 11D and 12A-12H.

Figure 11D:
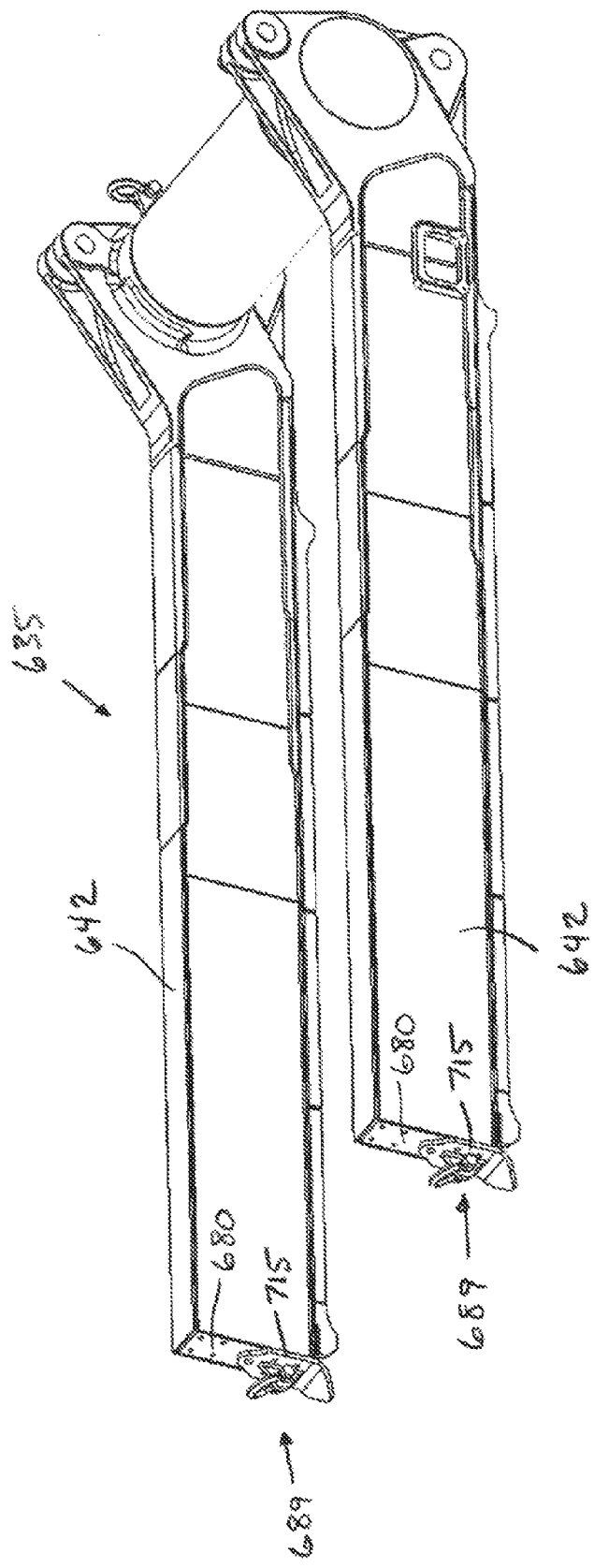
FIG. 11D is a perspective view of the handle and brackets and illustrating a standing handle assembly position of the brackets.
Figure 12B:
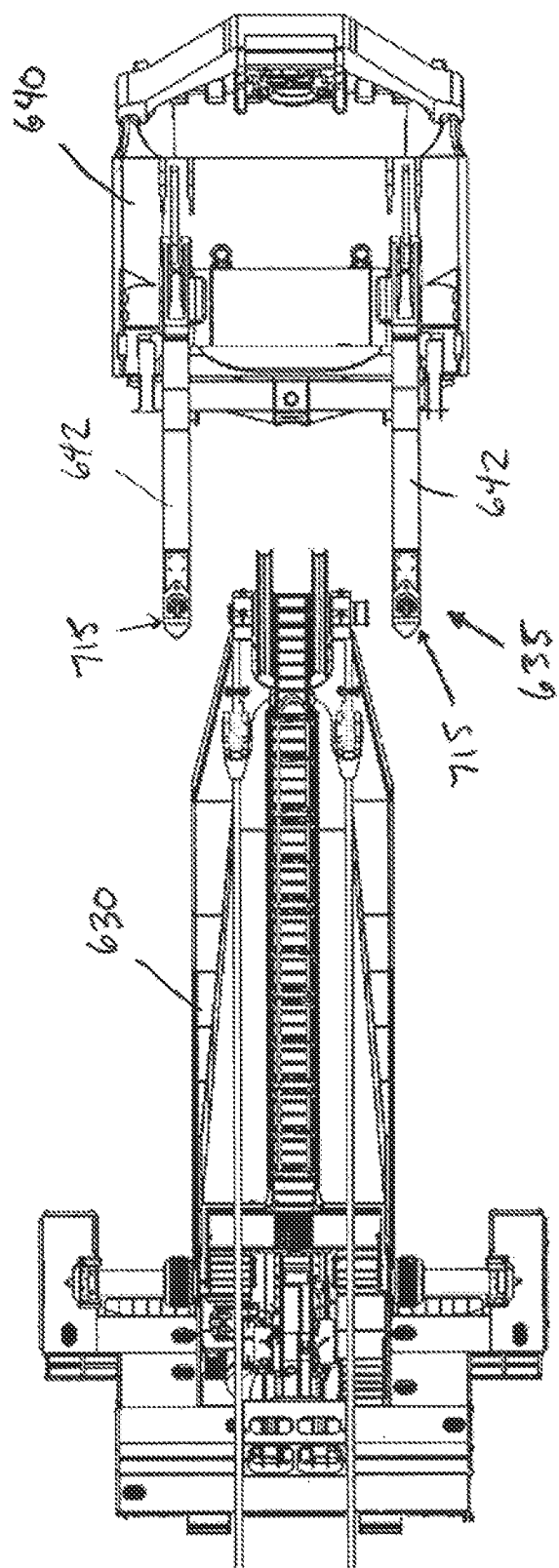
Figure 12C:
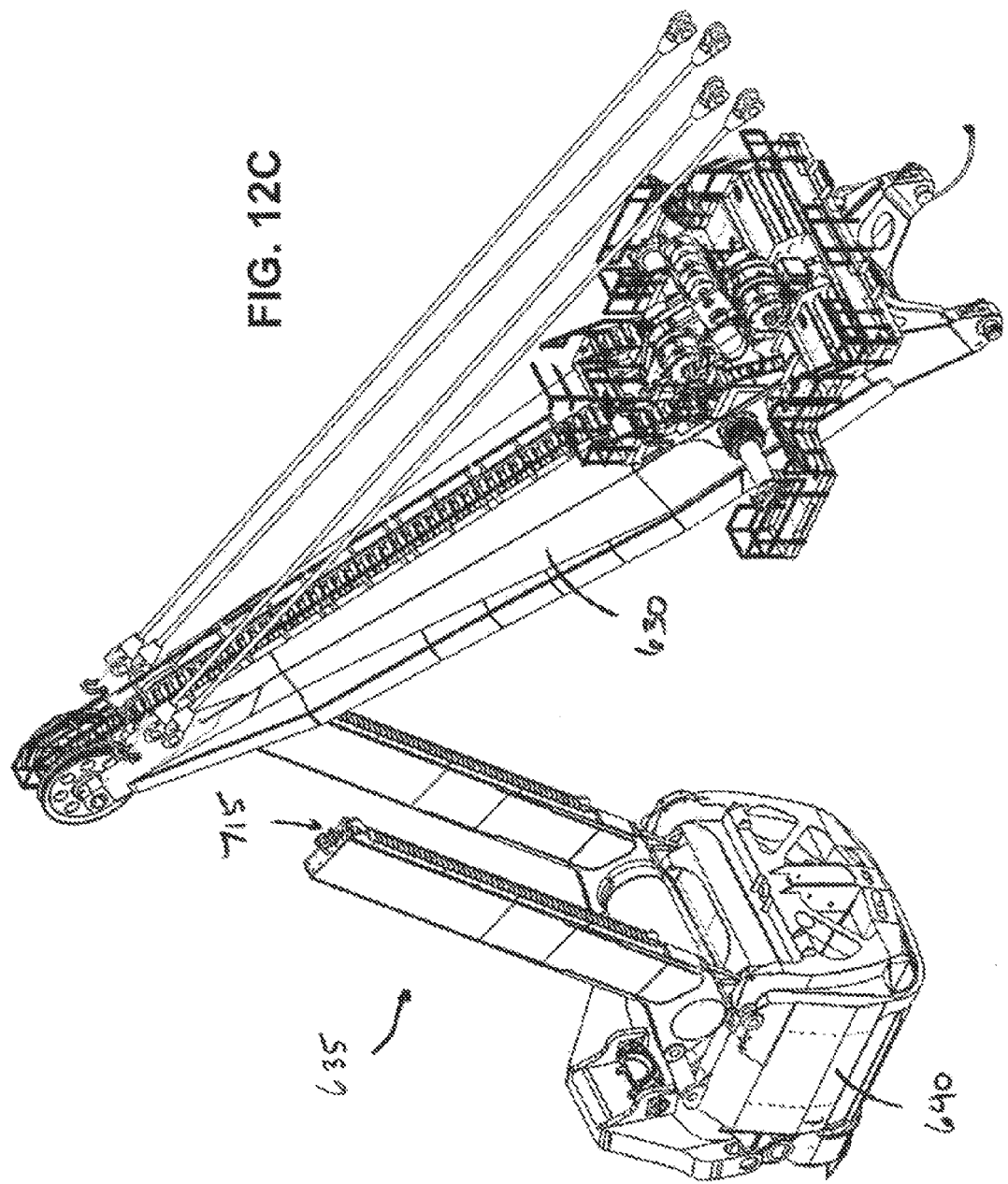
Figure 12E:
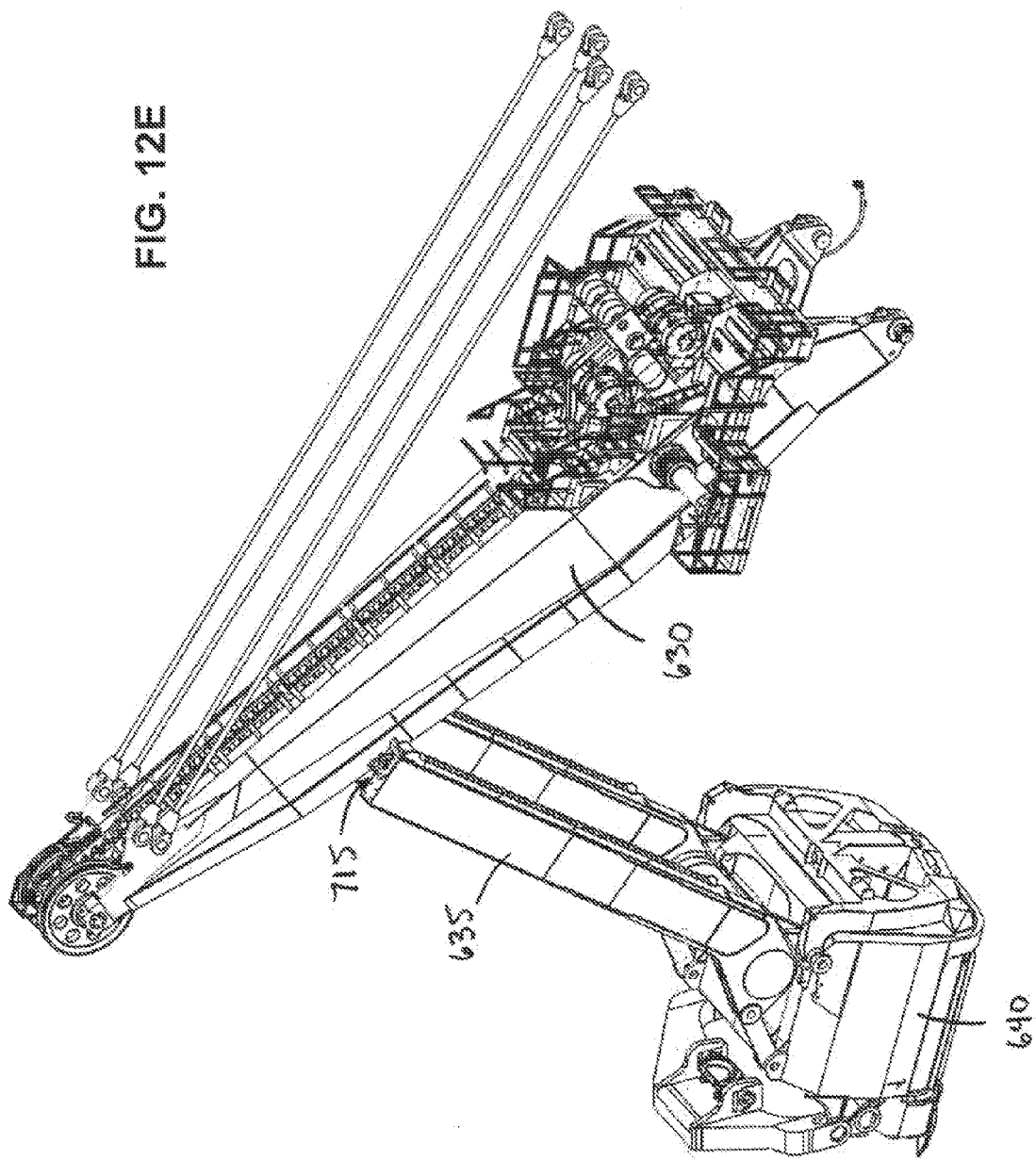
Figure 12G:
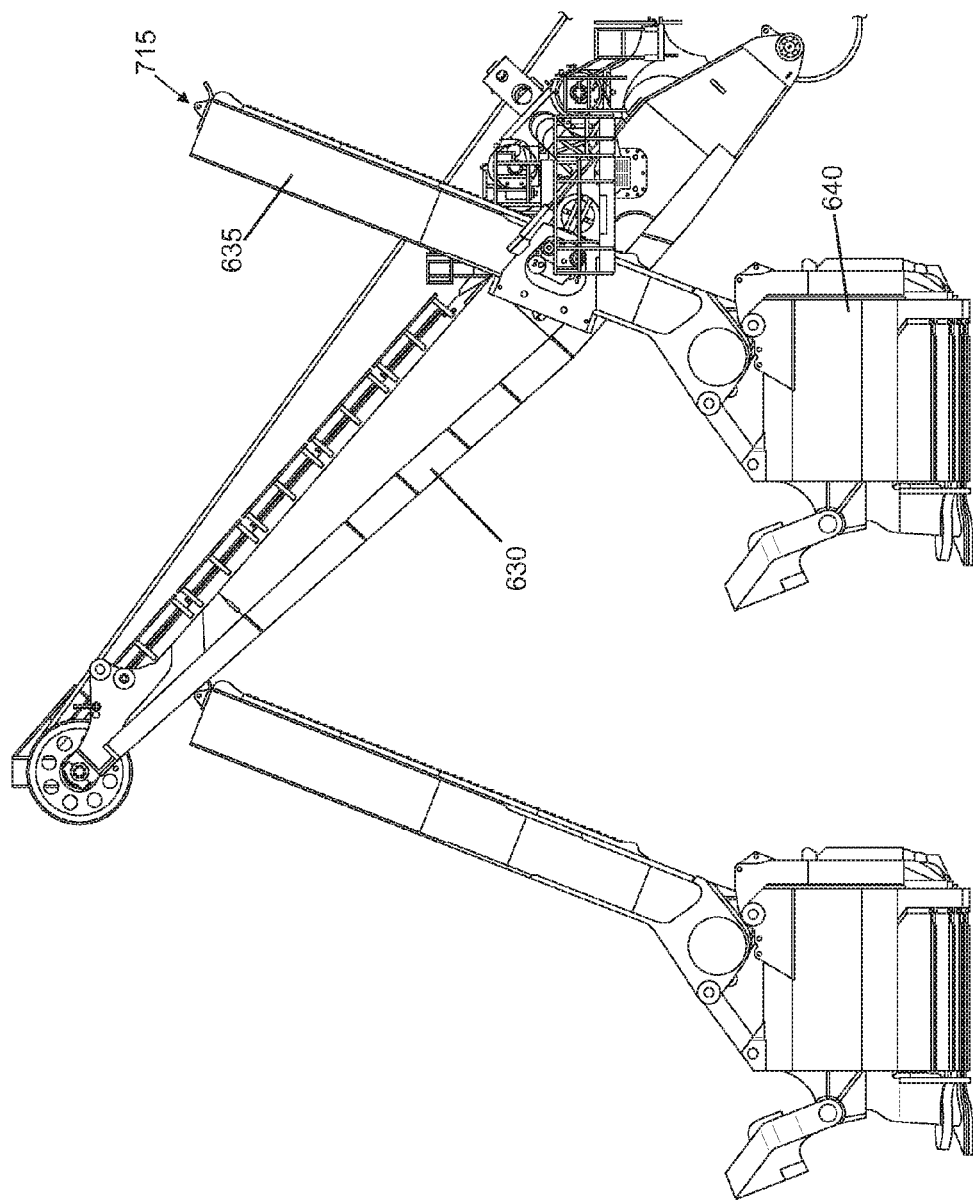
Figure 12H:
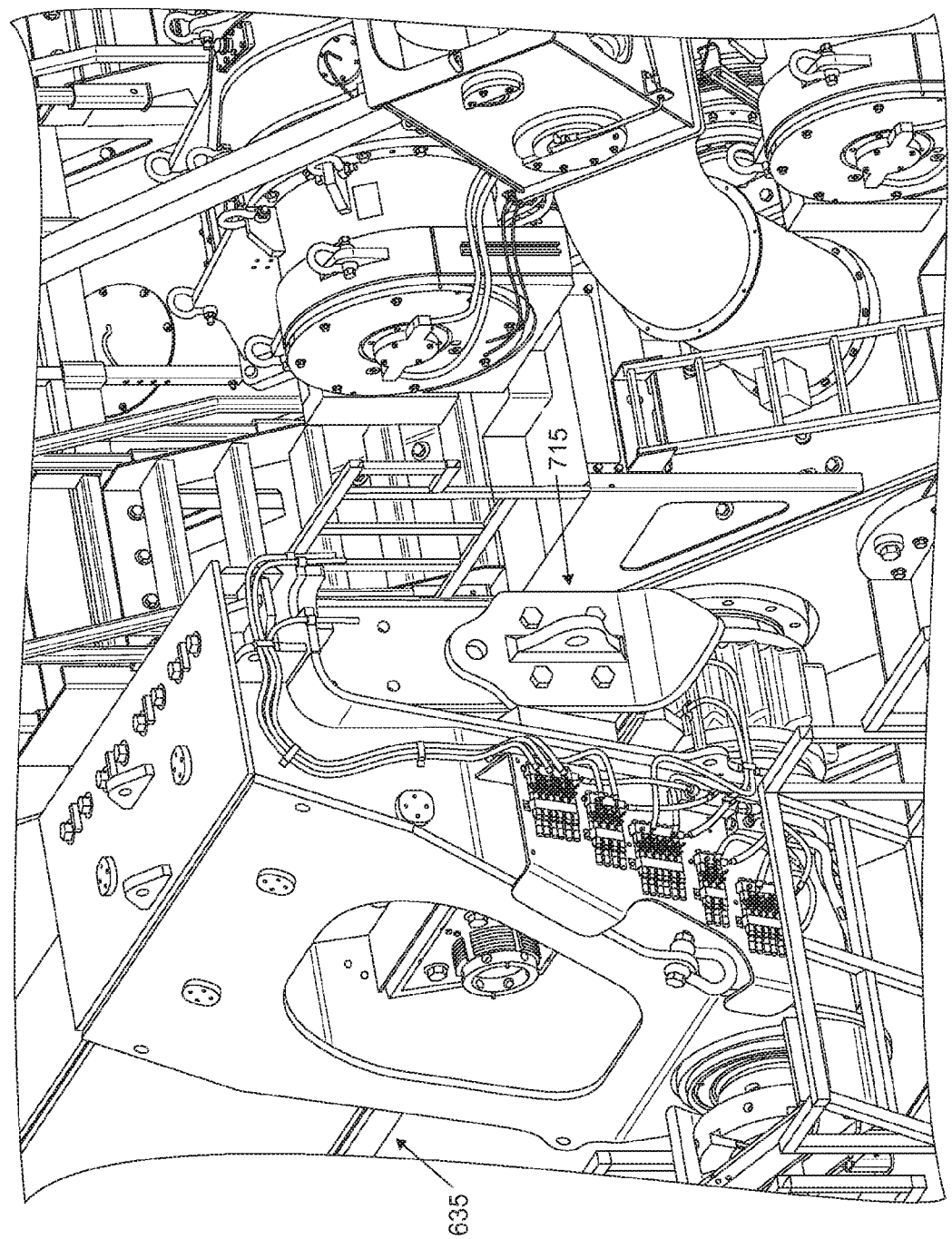

When the handle 635 is installed in the standing position, each bracket 715 is connected to an arm 642 in the second mounting position 689 and in the illustrated orientation (see FIG. 11D; the "standing assembly" position). In this position/orientation, each bracket 715 is generally aligned with the arm 642, and the second end 745 and the lifting opening 765 project below the bottom of the arm 642.

Installation of the handle 635 in the standing position is illustrated in FIGS. 12A-12H. With the handle 635 in position, the shovel 600 is moved forwardly to position the boom 630 between the arms 642. As the shovel 600 moves the boom 630 into position, the guide 760 on each bracket 715 is engageable with the boom 630 to guide the boom 630/handle 635 into proper position until the rack 665 engages the drive pinion 672. The saddle block 657 is installed after the handle 635 is positioned on the boom 630 (see FIGS. 12G-12H).

In other situations (see FIGS. 13A-13D), the handle 635 is lifted into position for installation. As shown in FIGS. 13A-13D, each bracket 715 is connected to an arm 642 in the first mounting position 687 and in a pivoted third orientation (a "lifted handle" position of the brackets 715). In this position/orientation, each bracket 715 is generally aligned with the arm 642, and the first end 740 and the guide 750 project above the top of the arm 642. As shown in FIG. 13D, a clevis 800 is connected to each lifting opening 735, and the handle 635 is lifted into position on the boom 630.

Figure 14A:
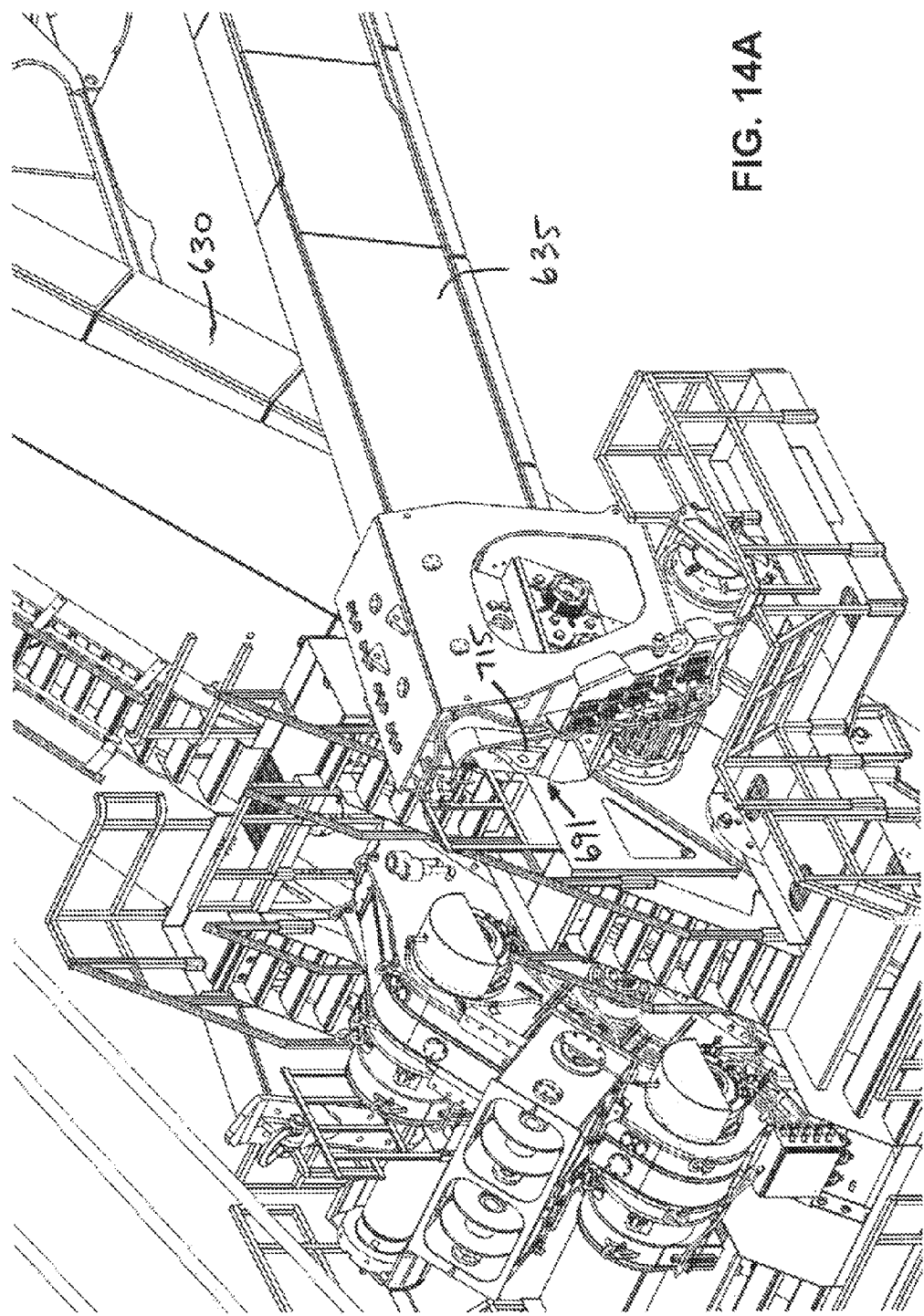

After the handle 635 is installed, the brackets 715 may be removed from the arms 642 or may be stored on the arms 642 (see FIGS. 14A-14B). As shown in FIGS. 14A-14B, each bracket 715 is connected to an arm 642 in the intermediate mounting position 691 and in a storage orientation (a "storage" position of the brackets 715). In this position/orientation, each bracket 715 is generally aligned with the arm 642 and is substantially within the periphery defined by the handle surfaces (sides and top and bottom). In the illustrated construction, the intermediate mounting position 691 is provided by openings 695 from each of the other mounting positions 687, 689.

Compared to the existing handle 500 (see FIG. 5A) and the handle 135' (see FIGS. 5A-5B and 6A-6C) with fixed lifting members 178', 578, respectively, the brackets 715 may provide flexibility for various lifting operations for the handle 635. Further, in the storage position, the brackets 715 may minimize the rearward extent of the handle 635.

Thus, the invention may generally provide, among other things, an industrial machine and a method of controlling an industrial machine to allow for optimal dipper extension during the digging phase while extending available dipper reach during the loading phase. The invention may also provide a modified handle to provide extended reach without extending the length of the handle. In addition, the invention may provide a bracket assembly for use in positioning and installing the dipper handle on the shovel.

One or more independent features and/or independent advantages of the invention may be set forth in the following claims:

What is claimed is:

1. An assembly for a shovel, the assembly comprising:
   a dipper handle including a first end operable to support a dipper, the dipper handle having an end surface opposite the first end, the end surface including a first mounting feature and a second mounting feature; and
   a bracket having a first surface engageable against the end surface and a second surface opposite the first surface, the bracket including a first lifting opening, a first end, and a second end, the first lifting opening being coupled to the second surface, the first end defining a guide surface, the second end including a second lifting opening, the bracket being selectively connected to one of the first mounting feature and the second mounting feature, the bracket being selectively positioned in a first orientation relative to the dipper handle and a second orientation relative to the dipper handle.

2. The assembly of claim 1, wherein each mounting feature includes a plurality of fastener-receiving openings, and wherein the assembly further comprises a plurality of fasteners, each of the plurality of fasteners being received in an associated opening to connect the bracket to the dipper handle in one of the first orientation and the second orientation.

3. The assembly of claim 1, wherein the bracket is selectively connectable to the first mounting feature in one of the first orientation and the second orientation.

4. The assembly of claim 1, wherein the first mounting feature and the second mounting feature cooperate to define an intermediate mounting feature, the bracket being connectable to the intermediate mounting feature in a third orientation.

5. The assembly of claim 4, wherein the end surface of the dipper handle defines a periphery, wherein, in at least one of the first orientation and the second orientation, a portion of the bracket extends beyond the periphery defined by the end surface, and wherein, in the third orientation, the bracket is within the periphery defined by the end surface.

6. The assembly of claim 1, wherein the dipper handle includes a pair of spaced apart arms, each arm having an end surface defining a first mounting feature and a second mounting feature, wherein the bracket is a first bracket selectively connectable to the end surface of one of the arms, and wherein the assembly further comprises a second bracket having a first surface engageable against the end surface of the other arm and a second surface opposite the first surface, the second bracket including a first lifting opening, a first end, and a second end, the first lifting opening provided on the second surface, the first end defining a guide surface, the second end defining a second lifting opening, the second bracket selectively connected to one of the first mounting feature and the second mounting feature of the other arm, the second bracket selectively positioned in a first orientation relative to the other arm and a second orientation relative to the other arm.

7. The assembly of claim 1, wherein the guide surface is configured to engage a surface of a boom to guide the dipper handle relative to the boom during assembly of the dipper handle to the boom.

8. A method for installing a dipper handle on a boom of a shovel, the dipper handle including a pair of parallel arms, each arm having a first end and a second end, each second end including an end surface having a periphery, the method comprising:
    coupling a bracket to an end surface of each arm in a mounting position, each bracket including a lifting opening and a guide surface positioned in an orientation relative to the dipper handle;
    while partially supporting the dipper handle by the lifting opening of each bracket, moving the dipper handle into an installation position; and
    moving one of the dipper handle and the boom in order to couple the dipper handle to the boom, as the dipper handle and the boom move toward one another, the guide surface of the bracket engaging the boom to align the dipper handle relative to the boom.

9. The method of claim 8, further comprising:
    uncoupling the bracket from the end surface; and
    re-coupling the bracket to the end surface in a second mounting position with the lifting opening and the guide surface positioned in a second orientation relative to the dipper handle.

10. The method of claim 9, wherein re-coupling the bracket to the end surface includes positioning the bracket with the lifting opening and the guide surface positioned within the periphery of the end surface.

11. The method of claim 8, wherein moving the dipper handle into an installation position includes positioning the dipper handle with the first ends of the arms engaging a support surface and the second ends of the arms positioned substantially vertically above the first ends.

12. The method of claim 8, wherein the dipper handle includes a rack on a lower portion of each arm, and wherein moving one of the dipper handle and the boom includes moving the boom between the second ends of the arms until the rack engages a drive pinion supported on the boom.

13. The method of claim 12, wherein coupling the bracket in the first mounting position includes positioning each bracket with the guide surface extending beyond the periphery of the respective end surface proximate the lower portion of the respective arm.

14. The method of claim 8, wherein moving one of the dipper handle and the boom includes
    partially supporting the dipper handle by the lifting opening of each bracket, and
    lifting the dipper handle into a position in which the handle is supported on the boom.

15. The method of claim 14, wherein coupling the bracket in the first mounting position includes positioning each bracket with the guide surface extending beyond the periphery of the respective end surface proximate an upper portion of the respective arm.

16. A dipper handle for a shovel, the dipper handle being operable to support a dipper, the handle comprising:
    a first end having a pin connection operable to support the dipper;
    a second end opposite the first end and defining an end surface, a distance between the first end and the second end defining a handle length; and
    a rack extending partially between the first end and the second end, the rack including a termination end proximate the first end and a greenhorn defining an end point of a usable portion of the rack, the greenhorn being positioned proximate the second end, the usable portion of the rack having a length at least 65% of the handle length.

17. The handle of claim 16, wherein a distance between the greenhorn and the end surface is less than 10% of the handle length.

18. The handle of claim 17, wherein a distance between the greenhorn and the end surface is less than 5% of the handle length.

19. The handle of claim 16, wherein a distance between the greenhorn and the end surface is less than 15% of the length of the usable portion of the rack.

20. The handle of claim 19, wherein a distance between the greenhorn and the end surface is less than 10% of the length of the usable portion of the rack.

21. The handle of claim 16, wherein the greenhorn defines a length, and wherein a distance between the greenhorn and the end surface is less than the length of the greenhorn.

* * * * *